United States Patent
Hughes et al.

(10) Patent No.: US 10,352,001 B2
(45) Date of Patent: Jul. 16, 2019

(54) RAIL RE-PROFILING METHOD AND APPARATUS

(71) Applicant: Greenleaf Technology Corporation, Saegertown, PA (US)

(72) Inventors: Donald R. Hughes, Meadville, PA (US); Charles D. Grabowski, Corcoran, MN (US)

(73) Assignee: GREENLEAF TECHNOLOGY CORPORATION, Saegertown, PA (US)

( * ) Notice: Subject to any disclaimer, the term of this patent is extended or adjusted under 35 U.S.C. 154(b) by 376 days.

(21) Appl. No.: 14/771,413

(22) PCT Filed: Mar. 14, 2014

(86) PCT No.: PCT/US2014/026942
§ 371 (c)(1),
(2) Date: Aug. 28, 2015

(87) PCT Pub. No.: WO2014/152094
PCT Pub. Date: Sep. 25, 2014

(65) Prior Publication Data
US 2016/0130768 A1   May 12, 2016

Related U.S. Application Data

(63) Continuation of application No. 13/841,036, filed on Mar. 15, 2013, now Pat. No. 9,617,691.

(51) Int. Cl.
*B23C 3/00* (2006.01)
*E01B 31/13* (2006.01)
(Continued)

(52) U.S. Cl.
CPC .............. *E01B 31/13* (2013.01); *B23C 3/005* (2013.01); *B23C 5/06* (2013.01); *B23C 5/207* (2013.01);
(Continued)

(58) Field of Classification Search
CPC ..... E01B 31/13; B23C 3/005; B23C 2220/00; B23C 2220/48; B23C 2215/32; Y10T 409/306384; Y10T 409/303808
(Continued)

(56) References Cited

U.S. PATENT DOCUMENTS

| 1,887,424 A | 11/1932 | Perazzoli |
| 2,690,610 A | 10/1954 | Begle et al. |

(Continued)

FOREIGN PATENT DOCUMENTS

| CN | 2830490 Y | 10/2006 |
| CN | 200970652 Y | 11/2007 |

(Continued)

OTHER PUBLICATIONS

Greenleaf Carbide Insert Grade Description, Greenleaf Corporation,18695 Greenleaf Drive, Saegertown, PA 16433, http://www.greenleafglobalsupport.com/wcsstore/Greenleaf/upload/docs/CarbideGrades.pdf, Jun. 2, 2011, 2 pages.

(Continued)

*Primary Examiner* — Erica E Cadugan
(74) *Attorney, Agent, or Firm* — K&L Gates LLP

(57) ABSTRACT

A method of milling a profile of a railway rail comprises: rotating a milling cutter including a plurality of face mounted cutting inserts mounted about a periphery thereof; milling a railway rail with cutting edges of the cutting inserts rotating in a predetermined plane corresponding to at least a portion of a desired rail profile while controlling the depth of cut of the cutting inserts; traversing the railway rail with (Continued)

the milling cutter while milling the railway rail; and controlling the speed of traverse of the milling cutter along the railway rail.

23 Claims, 26 Drawing Sheets

(51) Int. Cl.
    *B23C 5/06*     (2006.01)
    *B23C 5/20*     (2006.01)
    *B23Q 9/00*     (2006.01)

(52) U.S. Cl.
    CPC ............... *B23C 2210/0421* (2013.01); *B23C 2210/0428* (2013.01); *B23C 2210/0435* (2013.01); *B23C 2215/32* (2013.01); *B23C 2222/28* (2013.01); *B23Q 9/0028* (2013.01); *Y10T 407/1908* (2015.01); *Y10T 407/1912* (2015.01); *Y10T 407/1922* (2015.01); *Y10T 407/1932* (2015.01); *Y10T 409/3042* (2015.01); *Y10T 409/30952* (2015.01); *Y10T 409/303808* (2015.01); *Y10T 409/306216* (2015.01); *Y10T 409/306384* (2015.01); *Y10T 409/307672* (2015.01); *Y10T 409/307784* (2015.01); *Y10T 409/308344* (2015.01)

(58) Field of Classification Search
    USPC .................................................. 409/178, 132
    See application file for complete search history.

(56) References Cited

U.S. PATENT DOCUMENTS

| | | | |
|---|---|---|---|
| 3,116,538 | A | 1/1964 | Severson |
| 3,344,496 | A | 10/1967 | Patkay |
| 3,699,843 | A | 10/1972 | Sweeny |
| 4,295,764 | A | 10/1981 | Theurer et al. |
| 4,324,514 | A | 4/1982 | Craven |
| 4,372,714 | A | 2/1983 | Theurer |
| 4,507,897 | A | 4/1985 | Vieau et al. |
| 4,534,689 | A | 8/1985 | Theurer |
| 4,583,893 | A | 4/1986 | Line |
| 4,584,798 | A | 4/1986 | Rivoire |
| 4,622,781 | A | 11/1986 | Vieau et al. |
| 4,693,039 | A | 9/1987 | Vieau et al. |
| 4,732,515 | A | 3/1988 | Pomikacsek |
| 4,843,765 | A | 7/1989 | Panetti |
| 4,862,647 | A | 9/1989 | Vieau |
| 4,878,318 | A | 11/1989 | Panetti |
| 5,067,283 | A | 11/1991 | Pomikacsek |
| 5,111,624 | A | 5/1992 | Shoenhair et al. |
| 5,140,776 | A | 8/1992 | Isdahl et al. |
| 5,145,295 | A | 9/1992 | Satran |
| 5,265,379 | A | 11/1993 | Panetti |
| 5,716,167 | A | 2/1998 | Siddle et al. |
| 6,033,166 | A | 3/2000 | Hampel |
| 6,033,291 | A | 3/2000 | Mathison et al. |
| 6,139,410 | A | 10/2000 | Okumura et al. |
| 6,719,616 | B2 | 4/2004 | Mathison et al. |
| 6,746,307 | B2 | 6/2004 | Knoll et al. |
| 6,789,983 | B2 | 9/2004 | Mizutani |
| 6,921,319 | B2 | 7/2005 | Knoll et al. |
| 6,981,907 | B1 | 1/2006 | Korinek et al. |
| 7,156,723 | B2 | 1/2007 | Natarajan et al. |
| 7,390,150 | B2 | 6/2008 | Kocherovsky et al. |
| 8,262,323 | B2 | 9/2012 | Satran et al. |
| 8,556,545 | B2 | 10/2013 | Chen et al. |
| 8,985,914 | B2 | 3/2015 | Jansson |
| 9,834,891 | B2 | 12/2017 | Hughes et al. |
| 2007/0147969 | A1 | 6/2007 | Fenton |
| 2012/0288342 | A1 | 11/2012 | Rungger |
| 2013/0189045 | A1 | 7/2013 | Behrens |
| 2014/0271012 | A1 | 9/2014 | Hughes et al. |
| 2016/0333531 | A1 | 11/2016 | Behrens |
| 2017/0252835 | A1* | 9/2017 | Saffels ................ B23C 5/14 |
| 2017/0321383 | A1 | 11/2017 | Behrens |

FOREIGN PATENT DOCUMENTS

| | | | |
|---|---|---|---|
| DE | 2515678 | A1 | 1/1976 |
| DE | 3222208 | A1 | 12/1983 |
| DE | 202007014009 | U1 | 1/2008 |
| EP | 0668398 | A1 | 8/1995 |
| EP | 1820902 | A1 | 8/2007 |
| FR | 2450655 | A1 | 10/1980 |
| GB | 931267 | A | 7/1963 |
| GB | 2121710 | A | 1/1984 |
| JP | S60-184411 | A | 9/1985 |
| JP | 6-246524 | A | 9/1994 |
| JP | 2003-19616 | A | 1/2003 |
| JP | 2004-300667 | A | 10/2004 |
| WO | WO 95/20071 | A1 | 7/1995 |
| WO | WO 2014/152094 | A2 | 9/2014 |

OTHER PUBLICATIONS

Alpha Rail Team—Your Specialist for Rail Milling, Reprofiling and grinding of the rail profile in a single pass, http://www.vossloh-rail-services.com/media/downloads/pdfs/prospekte/13_Mobile_Milling_by_VRS.pdf, Sep. 2010, 4 pages.
Railgrinder, Wikipedia, http://en.wikipedia.org/wiki/Railgrinder, Feb. 28, 2013, 1 page.
Corrugation.Eu: Research and Facts, http://www.corrugation.eu/research/, Mar. 26, 2013, 4 pages.
Technical Data—Milling 101, Greenleaf Corporation, 18695 Greenleaf Drive, Saegertown, PA 16433, http://www.greenleafglobalsupport.com/wcsstore/Greenleaf/upload/docs/MAppData.pdf, Mar. 26, 2013, M58-M63.
Mobile Milling, Vossloh Rail Services, http://www.vossloh-rail-services.com/en/products_services/mobile_milling/mobile_milling.html, accessed Jun. 2, 2011, 2 pages.
Rail milling machine RFP 1, Enormous performance for the future!, European Railway Review, http://www.mfl.at/ENG/giessen/content.php?we_objectID=1535&navP=04&navID1=02&navID2=02&navID3=-&n=1, Jun. 2010, 1 page.
Rail Milling for Underground, http://www.railwaypeople.com/rail-news-articles/rail-milling-for-underground-1686.html, Mar. 27, 2009, 1 page.
Porr-Alpine Austriarail commissions the first rail milling train in Austria, Global cutting technology for mobile rail machining, http://www.alpine.at/en/presseinformation/porr-alpine-austriarail-stellt-den-ersten-schienenfraszug/, Nov. 3, 2008, 2 pages.
Milling—the new dimension of rail-profiling, European Railway Review, Issue 3 2008, May 28, 2008, 1 page.
Milling Machine That Sets World Record With Longest X-Axis, Qimtek, http://www.qimtek.co.uk/News/milling_machine_that_sets_world_record_with_longest_x-axis-784.html, May 12, 2008, 2 pages.
Milling (machining), Wikipedia, http://en.wikipedia.org/wiki/Milling_%28machining%29, Mar. 23, 2013, 14 pages.
MFL Maschinenfabrik Liezen Presents the Milling Train RFP 1, MFL Maschinenfabrik Liezen, http://www.railway-technology.com/contractors/track/maschinenfabrik/press1.html, Jan. 18, 2011, 2 pages.
Rail Milling Machines, Rail Sawing and Drilling Equipment, Rail Production Lines, MFL Maschinenfabrik Liezen, www.railway-technology.com/contractors/track/maschinenfabrik/, printed Jun. 2, 2011, 3 pages.
Abbott, J., "Grinding and milling are essential to rail quality", European Railway Review, Russell Publishing Ltd., Berkshire, United Kingdom, 2009, 1 page (abstract only).
First ever rail-mounted milling machine trials on UK railway, Rail Technology Magazine, Jul. 6, 2009, 4 pages.
Rail treatment: Rail milling, Schweerbau GmbH, http://www.schweerbau.de/en/pages/rail02.html, printed Jun. 2, 2011, 2 pages.
Rail Technology: Rail milling train SF02T-FS, http://www.linsinger.com/en/products/rail-technology/rail-milling-train/2-19-22.htm, Mar. 26, 2013, 1 page.

(56) References Cited

OTHER PUBLICATIONS

Rail milling train SF03-FFS, Linsinger Maschinenbau Austria, http://www.linsinger.com/en/products/rail-technology/rail-milling-train/2-20-23.htm, printed Jun. 10, 2016, 2 pages.
Rail milling train SF06-FFS Plus, Linsinger Maschinenbau Austria, http://www.linsinger.com/en/products/rail-technology/rail-milling-train/2-21-24.htm, printed Jun. 10, 2016, 2 pages.
Rail milling train MG31, Linsinger Maschinenbau Austria, http://www.linsinger.com/en/products/rail-technology/rail-milling-train-mg31/schienenfraeszug_mg31/2-31-37.htm, printed Jun. 10, 2016, 1 page.
MFL Sawing and milling technology download, Jun. 8, 2012, 19 pages.
Johnson et al., "Powder Power", Cutting Tool Engineering Magazine, Feb. 2008, vol. 60, No. 2, 4 pages.

\* cited by examiner

| Test | Insert Grade | Cutter RPM | Cutter SFM | Feed* | Wheel MPH Feed | Time In Cut | Avg. Wear Land** | No. Of Inserts with more than .015 wear land |
|---|---|---|---|---|---|---|---|---|
| 1 | G935 | 700 | 1466 | .047 | 1/2 | various | NA | NA |
| 2 | G935 | 900 | 1885 | .037 | 1/2 | various | NA | NA |
| 3 | G935 | 1500 | 3141 | .044 | 1.0 | various | NA | NA |
| 4 | G935 | 1500 | 3141 | .044 | 1.0 | 30 Min | .009 | 2 |
| 5 | G915 | 1500 | 3141 | .044 | 1.0 | 30 Min | .013 | 6 |

*Feed in inches/insert per revolution

**Avg. Wear Land in inches

FIG. 3

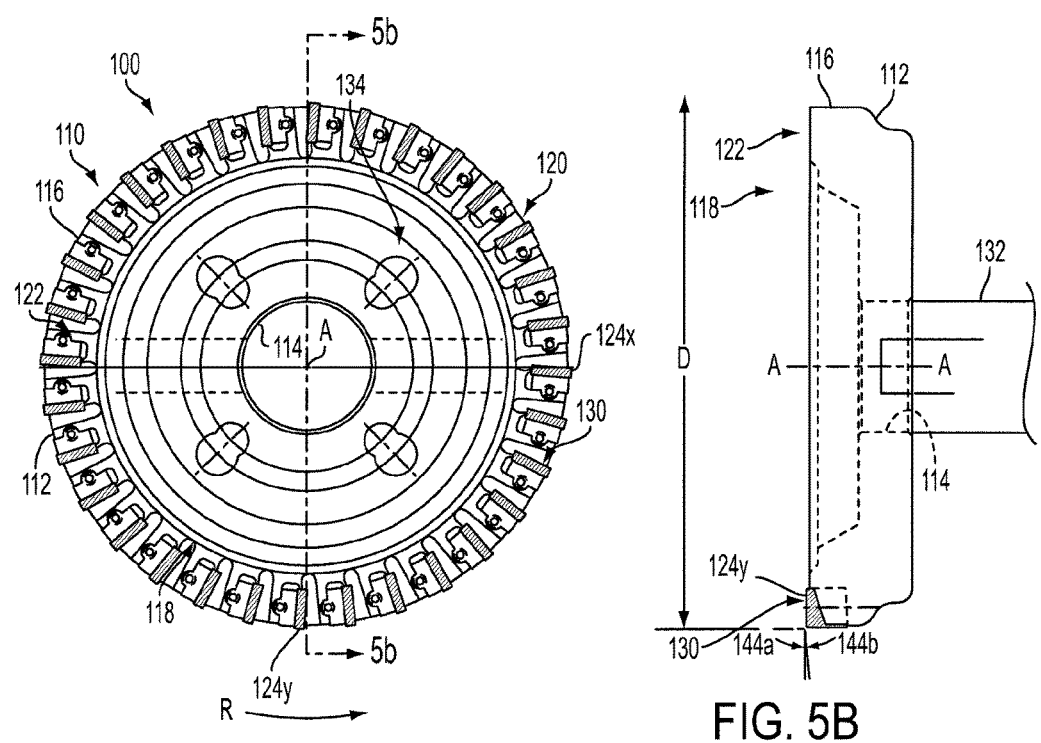
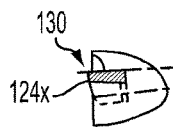
FIG. 5A
FIG. 5B
FIG. 5C

| Test No. | Insert- Pos or Neg | Insert Grade | RPM | SFM | No. of Inserts in Cutter | Programmed Feed per Insert (inches/revolution) | Actual Chip Load (inches) | Inch per Minute Feed | Actual MPH Feed | Estimated MPH Feed with a full load of 32 Inserts | Cutter Offset (see Cutter-Rail Orientation Options Layout) |
|---|---|---|---|---|---|---|---|---|---|---|---|
| G001 – G032 | Pos. | G955 | 1100 | 2879.8 | 4 | 0.091 | 0.0032 | 400.4 | 0.38 | 3.03 | On Center |

FIG. 11

| Test No. | Insert-Pos or Neg | Insert Grade | RPM | SFM | No. of Inserts in Cutter | Programmed Feed per Insert (inches/revolution) | Actual Chip Load (inches) | Inch per Minute Feed | Actual MPH Feed | Estimated MPH Feed with a full load of 32 Inserts | Cutter Offset (see Cutter-Rail Orientation Options Layout) (inches) | Climb or Conventional Milling |
|---|---|---|---|---|---|---|---|---|---|---|---|---|
| G001 | Pos. | GA5125 | 1100 | 2879.8 | 2 | 0.145 | 0.0051 | 319.0 | 0.30 | 4.83 | 4.00 | Climb |
| G002 | Pos. | GA5125 | 1100 | 2879.8 | 2 | 0.182 | 0.0064 | 400.4 | 0.38 | 6.07 | 4.00 | Climb |
| G003 | Pos. | GA5125 | 1100 | 2879.8 | 2 | 0.220 | 0.0077 | 242.0 | 0.23 | 7.33 | 4.00 | Climb |
| G004 | Pos. | GA5125 | 1100 | 2879.8 | 1 | 0.300 | 0.0105 | 330.0 | 0.31 | 10.00 | 4.00 | Climb |
| G005 | Pos. | GA5125 | 1100 | 2879.8 | 1 | 0.360 | 0.0126 | 396.0 | 0.38 | 12.00 | 4.00 | Climb |
| G006 | Pos. | GA5125 | 1100 | 2879.8 | 1 | 0.300 | 0.0105 | 330.0 | 0.31 | 10.00 | 4.00 | Climb |
| G007 | Pos. | GA5125 | 1100 | 2879.8 | 1 | 0.300 | 0.0105 | 330.0 | 0.31 | 10.00 | 4.00 | climb |
| G008 | NEG | GA5125 | 1100 | 2879.8 | 1 | 0.300 | 0.0105 | 330.0 | 0.31 | 10.00 | 4.00 | Climb |
| G009 | NEG | GA5125 | 1100 | 2879.8 | 1 | 0.300 | 0.0105 | 330.0 | 0.31 | 10.00 | 4.00 | Climb |
| G010 | NEG | GA5125 | 1100 | 2879.8 | 1 | 0.360 | 0.0126 | 396.0 | 0.38 | 12.00 | 4.00 | Climb |

FIG. 13A

| Test No. | Insert- Pos or Neg | Insert Grade | RPM's | SFM | No. of Inserts in Cutter | Programed Feed per Insert | Actual Chip Load | Inch per Minute Feed | Actual MPH Feed | Estimated MPH Feed with a full load of 32 Inserts | Cutter Offset (see Cutter-Rail Orientation Options Layout) | Climb or Conventional Milling |
|---|---|---|---|---|---|---|---|---|---|---|---|---|
| G001 | Neg | GA5125 | 825 | 2159.9 | 1 | 0.360 | 0.0126 | 297.0 | 0.28 | 9.00 | 4.00 | Climb |
| G002 | Neg | G955 | 825 | 2159.9 | 1 | 0.360 | 0.0126 | 297.0 | 0.28 | 9.00 | 4.00 | Climb |

FIG. 14A

| Test | Insert Grade | RPM | SFM | No. of Inserts in Cutter | Feed In/Min | Feed per Insert | Length of Cut |
|---|---|---|---|---|---|---|---|
| 1 | GA5125 | | | 3 | | | |
| 1 | G935 | 1,100 | 2,880 | 3 | 50.0 | .004 | 1 foot |
| 1 | G955 | | | 3 | | | |
| 2 | GA5125 | | | 3 | | | |
| 2 | G935 | 250 | 655 | 3 | 11.5 | .004 | 12 feet |
| 2 | G955 | | | 3 | | | |
| 3 | GA5125 | | | 3 | | | |
| 3 | G935 | 660 | 1,728 | 3 | 33 | .004 | 6 feet |
| 3 | G955 | | | 3 | | | |
| 4 | GA5125 | | | 3 | | | |
| 4 | G935 | 660 | 1,728 | 3 | 33 | .004 | 3 feet |
| 4 | G955 | | | 3 | | | |

FIG. 15

| Test No. | Insert Grade | Insert Edge Prep. | RPM's | SFM | No. of Inserts in Cutter | Max MPH | Feed per insert at Max MPH* | Min. MPH | Feed per insert at Min. MPH | Distance Traveled | Approx. Time in Cut | Climb or Conv. Mill | Cutter Offset (in) | Cutter Tip Angle** | Approx. Width of Cut (in) | Depth of Cut (in) |
|---|---|---|---|---|---|---|---|---|---|---|---|---|---|---|---|---|
| 1 | G955 | .015-.020 land .002-.003 hone | 1200 | 3142 | 32 | 1 | 0.0275 | 1 | 0.0275 | 800ft | 4 | climb | 4" | 45 | .2-.6 | .010-.060 |
| 2 | G955 | .015-.020 land .002-.003 hone | 825 | 2160 | 32 | 1 | 0.04 | 1 | 0.04 | 800 | 4 | climb | 4.00 | 45 | .2-.6 | .004-.010 |
| 3 | | | | | | | | | | | | | | | | |
| 4 | G9120 | .015-.020 land .002-.003 hone | 300 | 785 | 8 | 1 | 0.44 | 1 | 0.44 | 350 | 4 | climb | 4.50 | 35 | .2-.4 | .005-.010 |
| 5 | G9120 | .015-.020 land .002-.003 hone | 300 | 785 | 8 | 1 | 0.44 | 1 | 0.44 | 968 | 11 | climb | 4.50 | 35 | .2-.4 | .005-.010 |
| 6 | G9120 | .015-.020 land .002-.003 hone | 300 | 785 | 8 | 1 | 0.44 | 1 | 0.44 | 3080 | 35 | climb | 4.50 | 35 | .2-.4 | .005-.0010 |
| 7 | G9120 | .015-.020 land .002-.003 hone | 300 | 785 | 8 | 1 | 0.44 | 1 | 0.44 | 4676 ft | 52 | climb | 4.50 | 35 | .2-.4 | .005-.010 |
| 8 | G9120 | .015-.020 land .002-.003 hone | 300 | 785 | 8 | 1 | 0.44 | 1 | 0.44 | 8976 ft | 102 | climb | 4.50 | 35 | .2-.4 | .005-.010 |

*Feed per insert at Max. MPH in inches/revolution
** Cutter Tip Angle in degrees

FIG. 18A

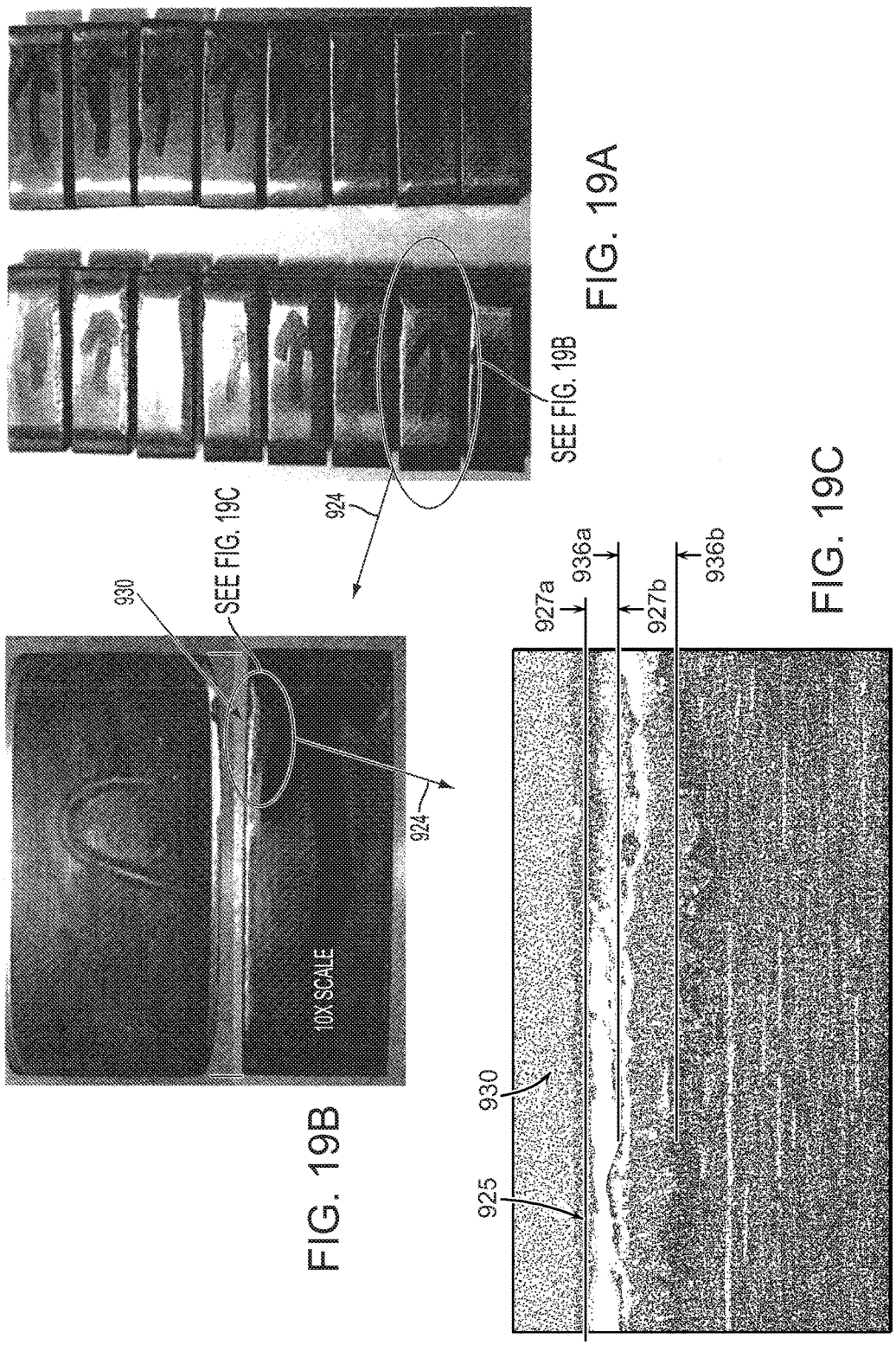

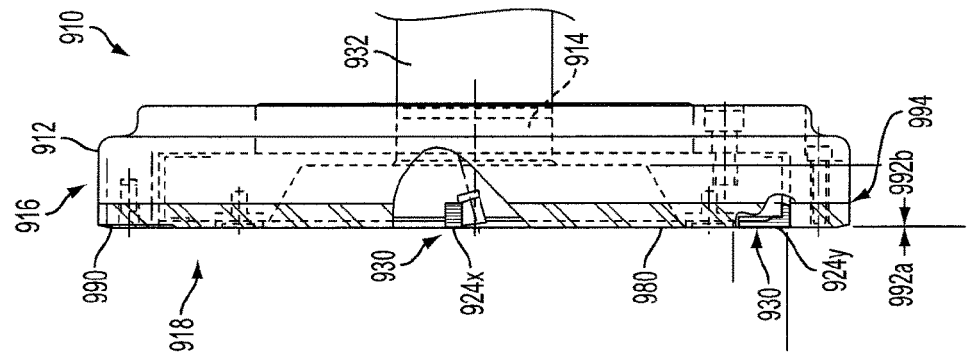
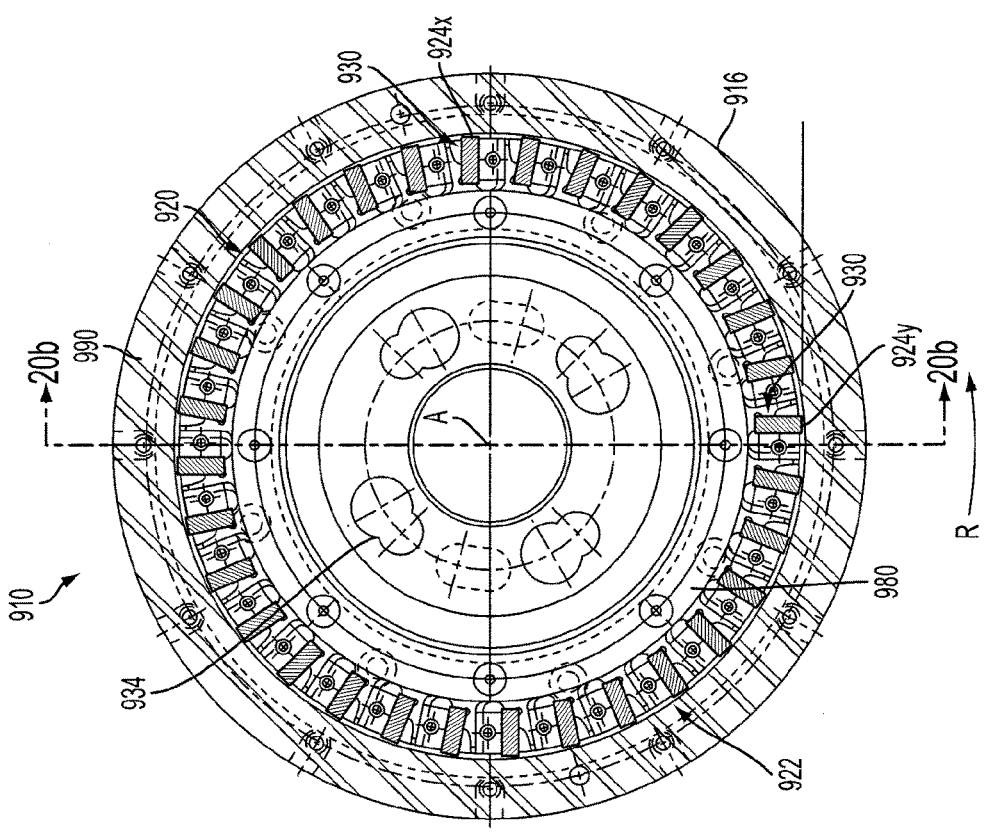

RAIL RE-PROFILING METHOD AND APPARATUS

BACKGROUND OF THE TECHNOLOGY

Field of the Technology

The present disclosure generally relates to equipment and techniques for milling. The present disclosure more specifically relates to equipment and techniques adapted for milling railway rails.

Description of the Background of the Technology

Railways networks are in use throughout the world for freight and transit alike. Over time, railway rails become worn and irregularities may arise, especially along the railhead profiles. Consequently, railways must be maintained by either replacing or re-profiling worn or deformed rails. For example, rail re-profiling may be undertaken to address common rail deformities such as rail corrugation, which may comprise short to long wavelengths. Corrugations are known to cause noise, vibrations, and premature wheel wear. Rail re-profiling may also be undertaken as part of a regular maintenance schedule aimed at extending the operational life of rails.

To minimize interference with rail traffic and to reduce labor costs, it is often advantageous to re-profile worn rails in situ. While in situ re-profiling may avoid extended offline periods, present re-profiling strategies comprising planing, grinding, and, more recently, peripheral milling are generally slow and/or hazardous endeavors. For example, rail grinding may employ one or more grinding wheels mounted to a rail grinding vehicle. Rail grinding vehicles are known to produce significant quantities of sparks during the grinding process, which may present a significant fire hazard along the railway at its periphery. Conventional rail re-profiling vehicles also are known to produce chatter and may be unable to produce desirable smooth and continuous railhead profiles. Certain conventional rail milling vehicles employ peripheral milling techniques to mill a predetermined profile on the rails. While presenting less fire risk than rail grinding vehicles, rail milling vehicles typically advance along the railway slowly and may require that the railway be taken out of service for an extended period. Rail milling vehicles also may be unable to continuously mill rail. For example, peripheral milling cutters used on such vehicles are designed to form a specific railhead profile and, therefore, are unable to adequately adapt to changing rail conditions such as variations in the railhead profile, curves, or transitions (such as, for example, railway grade crossings). Consequently, the conventional rail milling process may be slowed in order to adjust or replace milling cutters to match the rail profile variations, adapt to changes in the condition of the rails, or address curves or transitions. In some instances, large sections of railway must be ignored or are inadequately milled due to variations or transitions.

Given the foregoing drawbacks, it would be advantageous to develop improved techniques for rail re-profiling.

SUMMARY

According to one aspect of the present disclosure, a method of milling a profile of a railway rail comprises: rotating a milling cutter including a plurality of face mounted cutting inserts mounted about a periphery thereof; milling a railway rail with cutting edges of the cutting inserts rotating in a predetermined plane corresponding to at least a portion of a desired rail profile while controlling the depth of cut of the cutting inserts; traversing the railway rail with the milling cutter while milling the railway rail; and controlling the speed of traverse of the milling cutter along the railway rail.

According to certain non-limiting embodiments, the method further comprises milling the railway rail with a plurality of milling cutters, each milling cutter including a plurality of face mounted cutting inserts mounted about a periphery thereof. In such method, cutting edges of the cutting inserts of each milling cutter are rotated in a predetermined plane corresponding to at least a portion of a desired rail profile.

According to an additional aspect of the present disclosure, an apparatus for milling at least a portion of a desired profile on a railway rail in situ comprises: a milling cutter including a cutter body comprising a cutter face, wherein the milling cutter is rotatable about a rotation axis; and a plurality of cutting inserts mounted around a periphery of the cutter face. Each of the plurality of cutting inserts comprises a cutting edge extending a distance from the cutter face to engage and mill a profile segment on the railway rail. The rotation axis is substantially perpendicular to the plane of the profile segment to be milled on the railway rail by the cutting inserts.

According to certain non-limiting embodiments, the apparatus further comprises a plurality of milling cutters, each milling cutter including a cutter body rotatable about a rotation axis and a cutter face. A plurality of cutting inserts are mounted around a periphery of the cutter face of each of the plurality of milling cutters, and each of the plurality of cutting inserts comprises a cutting edge extending a distance from the cutter face to engage a railway rail and mill a segment of a desired profile on the railway rail.

According to certain non-limiting embodiments, the apparatus may comprise a rail vehicle on which are mounted the plurality of milling cutters. In certain embodiments, the plurality of milling cutters are individually mounted to respective spindles, and each of the plurality of milling cutters is individually positionable about a railway rail to mill a plurality of segments of a desired profile on the railway rail.

BRIEF DESCRIPTION OF THE DRAWINGS

The various embodiments of methods and apparatuses described herein may be better understood by considering the following description in conjunction with the accompanying drawings.

FIG. 3 is a table providing various parameters used to evaluate certain milling cutter configurations as described herein;

FIGS. 5A-5C schematically illustrate features of a milling cutter according to various embodiments described herein;

FIG. 11 is a table providing various parameters used in evaluating certain milling cutters configurations as described herein;

FIG. 13A is a table providing various parameters used in evaluating certain configurations of milling cutters as described herein;

FIG. 14A is a table providing various parameters used in evaluating certain milling cutter configurations as described herein;

FIG. 15 is a table providing various parameters used in evaluating certain configurations of milling cutters as described herein;

FIG. 18A is a table providing various parameters used in evaluating certain configurations of milling cutters as described herein;

FIGS. 19A-C provide photographic depictions of various cutting inserts used in testing described herein;

FIGS. 20A and 20B schematically illustrate certain features of a milling cutter according to various embodiments described herein;

DETAILED DESCRIPTION OF CERTAIN NON-LIMITING EMBODIMENTS

Figure 1A:
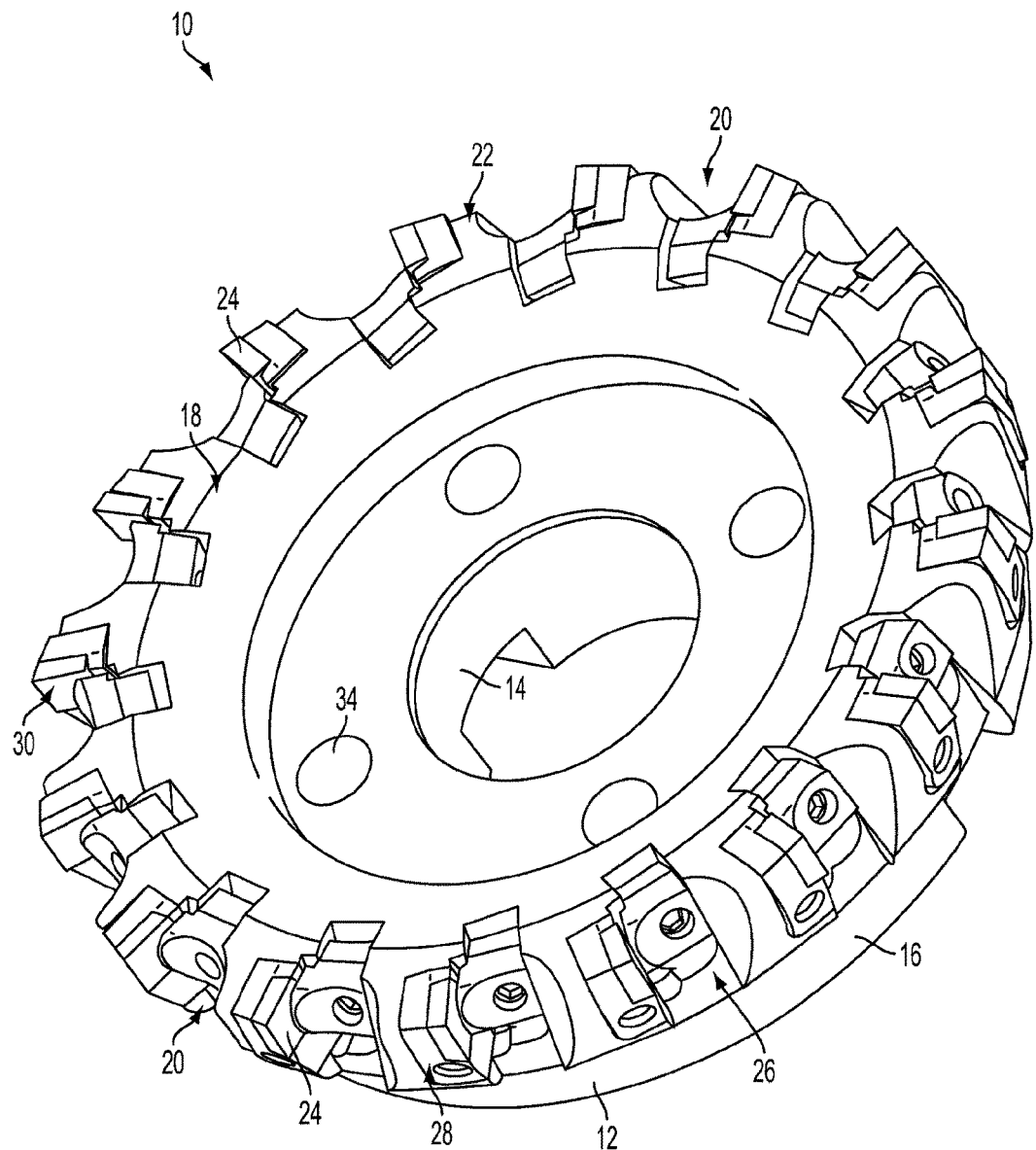
FIG. 1A is a perspective view of a milling cutter according to various embodiments disclosed herein.

The present disclosure describes various embodiments of apparatuses, milling cutters, milling inserts, and milling methods for re-profiling railway rails. In one embodiment, a milling cutter according to the present disclosure comprises a plurality of cutting inserts. The cutting inserts may be positioned in one or more orientations proximate to a railway rail to be re-profiled. In certain forms, the milling cutter comprises a cutter body configured to retain a plurality of cutting inserts, for example, indexable cutting inserts, thereon. The milling cutter may traverse the railway rail while rotating about a central axis. Each of the plurality of cutting inserts may comprise a cutting edge configured to engage the rail during rotation of the cutter body to thereby remove material from the rail and provide a desired rail profile or rail profile portion or region. In various embodiments, a vehicle is provided including one or more milling cutters configured to mill a desired profile in a railway rail, true the rail, and provide a continuous finish while traversing the rail at speeds greater that 1 mph, such as greater than 3 mph, up to 15 mph, 1 to 15 mph, 5 to 15 mph, 10 to 15 mph, or faster speeds. In certain embodiments, the milling cutter may be mounted on a vehicle and is movable about one or more axes such that the milling cutter may be adjustably positioned proximate to the rail in one or more orientations to restore the rail to a desired profile.

In one embodiment, one or more milling cutters provided on a railway vehicle may be rotatable about a vertical axis or about an axis at an angle to the vertical. For example, a milling cutter comprising a plurality of cutting inserts secured about a periphery of a face of the milling cutter may be positioned proximate to a rail to engage and thereby mill and impart a desired profile or profile portion or region to the rail. According to one embodiment, such a milling strategy may be considered a form of face milling, which the present inventors have discovered allows for high feed rates by suitably distributing chip load. The use of face milling distinctly differs from milling strategies known for rail re-profiling, such as peripheral milling. Peripheral milling may include a cutter mounted and rotated on a horizontal axis, and cutting inserts are spaced about the periphery of the milling cutter in an arrangement defining the profile to be cut. Railway vehicles conducting peripheral milling are not capable of moving at the speeds possible with rail re-profiling methods and apparatuses described herein. The ability to mill profiles into railway rail in situ at higher speeds than conventional peripheral milling re-profiling techniques may reduce the time during which the railway is out of service for re-profiling. In addition to lacking an ability to traverse the rail at high speeds, peripheral milling also lacks an ability to adapt to curved rail sections. Peripheral milling vehicles, which include single cutters defining the form to be cut, may produce deviations from a desired rail profile along curved rails, as well as produce an undesirable scalloped finish on the railhead.

In certain embodiments according to the present disclosure, multiple face milling cutters may be mounted on a rail vehicle and are individually positionable to contact the rail in different orientations to re-profile the rail. The multiple milling cutters may be orientated such that at least two of the milling cutters are positioned to mill different portions or regions of the desired rail profile on the rail. For example, in one embodiment, a first milling cutter may be positioned to mill a first facet on the rail, and a second milling cutter may be positioned to mill a second facet on the rail. Both the first and second facets may be simultaneously milled on different regions of the rail as a vehicle on which the milling cutters are mounted traverses the rail.

In one embodiment according to the present disclosure, the milling cutters may be mounted on one or more dedicated rail vehicles. The milling cutters may each be operably coupled to a dedicated or shared motor operable to rotate the milling cutters at a desired rate. In one embodiment, two or more milling cutters may couple to a positioning member or system configured to position the milling cutter proximate to a rail. The positioning member or system may comprise motors, gears, hydraulics, pumps, or the like. In various forms, the positioning member or system may be manually operated, computer assisted, or automated. For example, in one embodiment, a positioning member or system is operably coupled to a control system configured to control various operations of the milling cutter. In one embodiment, the control system comprises a guidance system. The guidance system may be programmed to scan ahead of the milling cutter, e.g., employing a laser or other detection apparatus, to provide information to the guidance system regarding the characteristics of approaching segments of the rail. The guidance system may use the information to calculate an optimum depth of cut, width of cut, or modification to a milling cutter position or orientation, or supply of power. In various embodiments, the guidance system may control or provide feedback to other system components to modulate a cutting operation, either directly or indirectly. For example, feedback from the guidance system may result in a modification to the position of the spindle head.

Figure 1B:
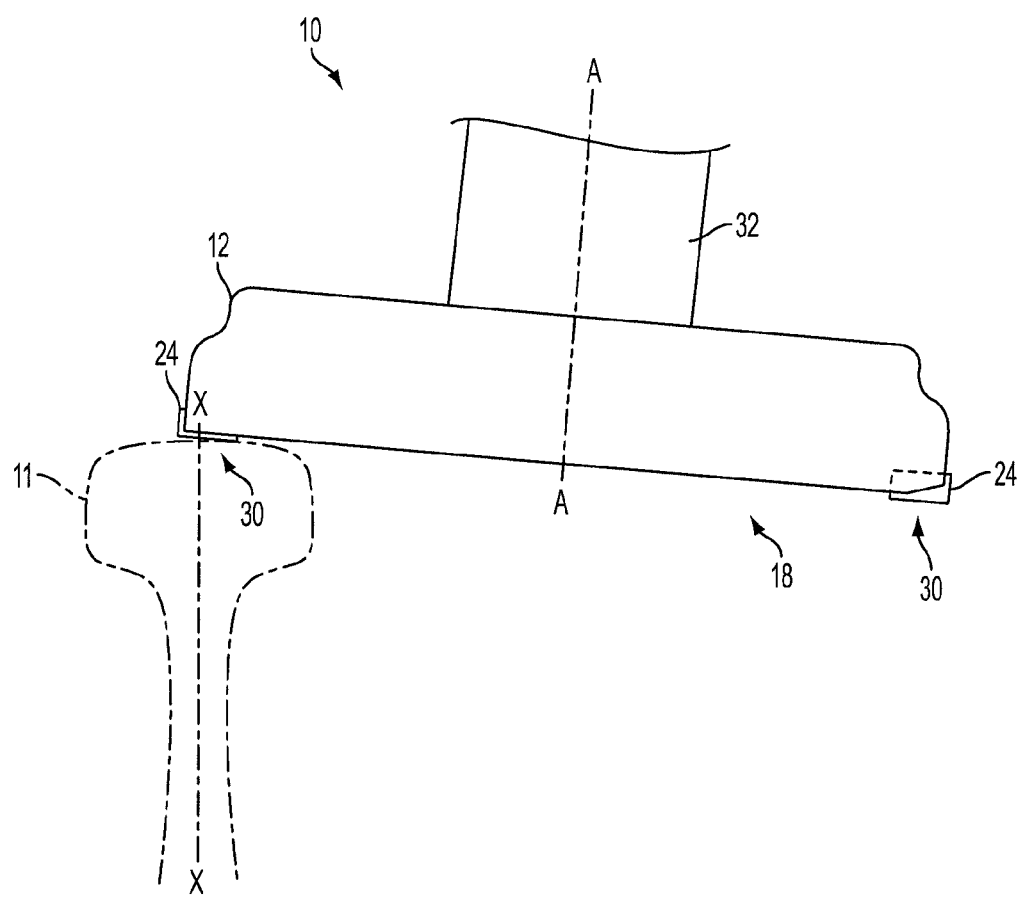
FIG. 1B schematically illustrates a milling cutter positioned to engage and mill a railway rail according to various embodiments described herein.
Figure 2:
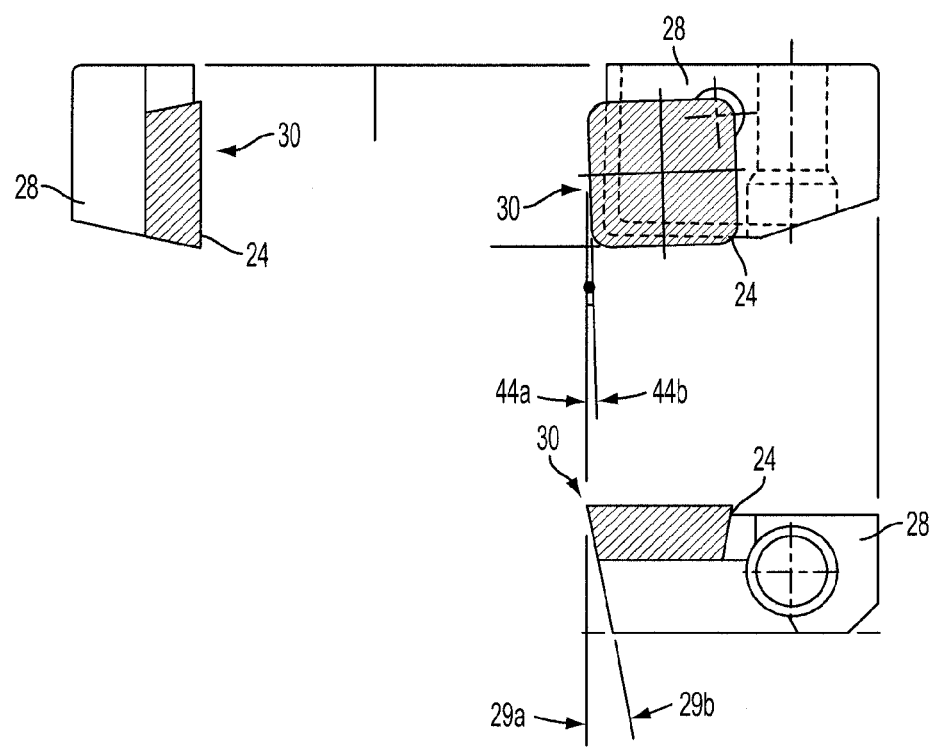
FIG. 2 schematically illustrates certain features of a milling cutter according to various embodiments described herein.

Referring to FIGS. 1A, 1B, and 2, in various embodiments according to the present disclosure, a method and apparatus for profiling a railway rail comprises rotating a milling cutter 10 about an axis "A" and in a controlled orientation and position while contacting a railway rail 11. The milling cutter 10 may include a cutter body 12 that defines a central diameter 14 and an outer circumference 16. The cutter body 12 may include a cutter face 18 defining a plurality of cutting insert positions 20 disposed about a periphery 22 of the cutter face 18. Each of the plurality of cutting insert positions 20 may be configured to receive a cutting member, e.g., a cutting insert 24. The cutting inserts 24 may be positioned within the insert positions 20 and retained therein with a retaining assembly 26, e.g., a wedge, bolt, or other clamping assembly known in the art. The milling cutter 10 illustrated in FIG. 1A comprises a plurality of cutting inserts 24, each positioned within a nest 28. The cutting inserts 24 may be positioned to extend a distance from the cutter face 18 to engage a workpiece, e.g., a rail 11, at one or more cutting edges 30 of the individual cutting insert 24. In various embodiments, the central diameter 14 of the cutter body 12 may be dimensioned to mount to a spindle 32 for rotation about rotation axis "A". The cutter body 12 further defines a plurality of holes 34 structured to receive bolts to fix the rotation of the spindle 32 to the cutter body 12.

In operation, the milling cutter 10 may be rotated by the spindle 32 while continuously traversing the rail 11 so that the rail 11 is continuously fed to the rotating cutting inserts 24 positioned about the periphery of the cutter face 18, as generally depicted in FIG. 1B. To produce a desired profile or facet (i.e., a profile portion or region) on a region of the rail 11, the milling cutter 10 and the cutting inserts 24 secured thereto may be orientated at a predetermined angle with respect to the axis "X-X" of the rail 11. For example, in one embodiment, the milling cutter 10 is positioned relative to the rail 11 so that the cutting edges 30 of the cutting inserts 24 are positioned in a predetermined plane corresponding to at least a portion or region of the profile to be milled on the rail 11.

In various embodiments, a rail re-profiling apparatus and method comprises a rotating milling cutter 10 having a plurality of cutting inserts 24 mounted around the periphery 22 of the cutter face 18. According to certain embodiments, the milling cutter 10 may traverse a workpiece, e.g., a railway rail, at a speed of less than 1 mph up to about 15 mph, at 5 to 15 mph, at 10 to 15 mph, or at faster speeds. For example, the milling cutter 10 may be rotated and pass along the rail 11 such that the rail 11 is fed to the rotating milling cutter 10 at a feed rate corresponding to the speed of the vehicle on which the milling cutter 10 is mounted, to produce a desired rail profile.

To develop the disclosed milling apparatuses and methods for re-profiling surfaces on a railway rail while maintaining adequate rail finish and profile, various high feed milling cutter 10 and cutting insert 24 combinations where prepared and tested. In general, a high feed milling cutter 10 was developed that utilizes insert lead angles to create a chip-thinning effect that allows the milling cutter 10 to run at higher than normal feed rates at relatively shallow depths of cut. According to various embodiments, the high feed milling cutter 10 preferably comprises a medium pitch or a fine pitch milling cutter. FIG. 1A is a perspective view of a generalized depiction of a milling cutter 10 configurable as a high feed milling cutter according to various non-limiting embodiments. For example, the milling cutter 10 may be mounted to a rail car for high speed milling of rails 11. In this configuration, the milling cutter body 12 has an 8-inch diameter and includes 16 cutting insert positions 20 housing 16 separate cutting inserts. FIG. 2 illustrates a nested cutting insert configuration and includes a cutting insert 24 in a nest 28 adapted to receive the insert. The illustration at the top right of FIG. 2 provides a top view of the cutting insert 24 and a nest 28 within which the cutting insert 28 is nested. The illustration at the top left of FIG. 2 provides a side view of the nest 28 and cutting insert 24. The illustration at the bottom right of FIG. 2 provides an end view, e.g., a view of the portion of the nest and cutting insert 24 positioned about the circumference of the cutter body 12 when held within the cutter body. The insert 24 is disposed at a 2° lead angle (measured between 44a and 44b) in the nest, and the insert 24 has an 11° degree relief (measured between 29a-29b).

The effectiveness of the milling cutter 10 for high speed milling of railway rails has been demonstrated by rotating the milling cutter 10 against a rotating rail steel wheel to simulate traversing a railway rail. Specifically, the milling cutter 10 was mounted to a spindle 32 extending from a 30 horsepower test machine. The milling cutter 10 was rotated counter-clockwise against a 37-inch diameter wheel formed of rail steel that was rotated clockwise at various rotational speeds to correspond to a specific mph. The parameters of this test are provided in FIG. 3. During the test, the width of cut was maintained between about 0.38-0.62 inches at a depth of cut of about 0.010 inches. In Tests 1-3, the rotational speed of the milling cutter was progressively ramped from an initial 700 RPM up to 1500 RPM, and the rotational speed of the rail steel wheel was progressively ramped from a rotational speed corresponding to 0.5 mph up to a speed corresponding to 1 mph. A full complement of 16 inserts were mounted on the milling cutter and used in Tests 2-5 listed in FIG. 3. Following the speed ramping tests, new inserts 24 were positioned in the cutter body 12 for Test 4 and Test 5 listed in FIG. 3 in order to evaluate two sets of PVD-coated carbide inserts 24. The cutting insert grades used in the testing were Greenleaf® grade G-935, a PVD-coated C5 cemented carbide grade, and Greenleaf® grade G-915, a PVD-coated C1 cemented carbide grade, both of which grades are available from Greenleaf Corporation, Saegertown, Pa. USA.

Figure 4:
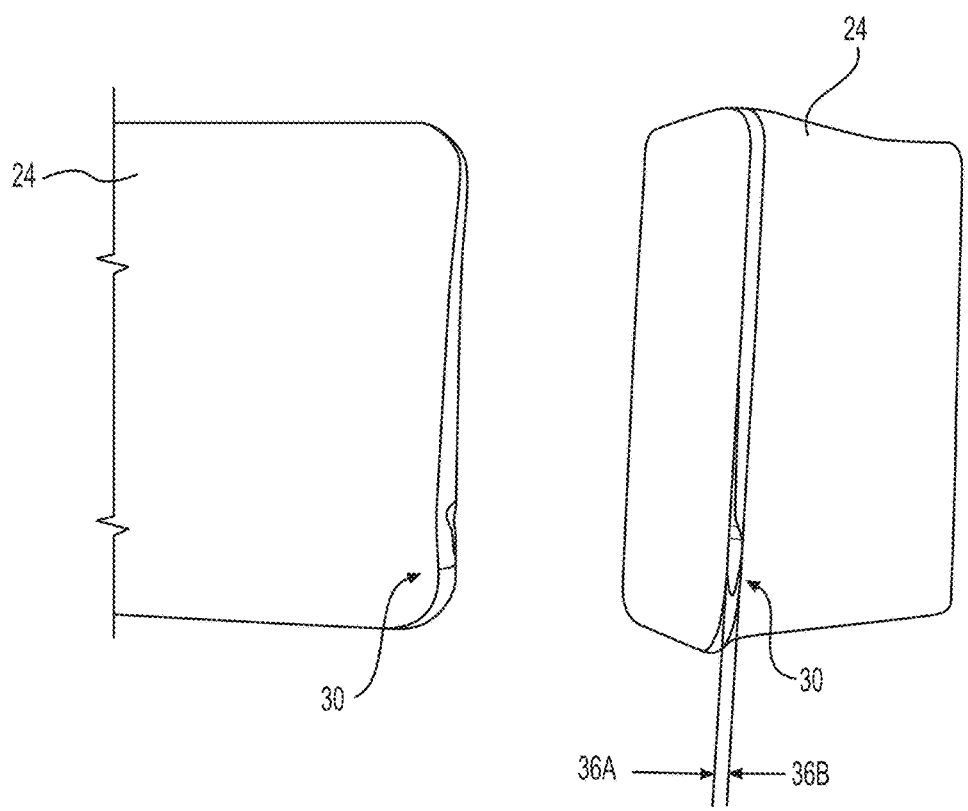
FIG. 4 presents photographs of a milling insert used in certain testing conducted according to parameters listed in the table of FIG. 3.

FIG. 4 (left panel) is a photographic depiction of a top view of a cutting edge 30 of a cutting insert 24 showing typical edge wear observed in Test 5. FIG. 4 (right panel) is a photographic depiction of a side view of the cutting edge 30 depicted in the left panel. Wear land (36a-36b) measurements were taken from each insert 24 to determine which test grade performed more favorably. The average wear land (36a-36b) for cutting inserts made from Greenleaf® grade G-935 material used in Test 4 was 0.009 inches, with 2 of the 16 inserts showing more than 0.019 inches of wear land (36a-36b). The average wear land (36a-36b) for the cutting inserts made from Greenleaf® grade G-915 material used in Test 5 was 0.013 inches, with 6 of the 16 inserts showing more than 0.019 inches of wear land (36a-36b).

While the heavy feed rate used in the testing, ranging between 0.037 to 0.047 inches per insert per revolution (which may be shortened herein to "inches per insert"), produced less than optimal part finish, the part finish was within acceptable limits. Consequently, the results at 1 mph demonstrated that an acceptable rail finish may be achieved at higher feeds. The results also demonstrated that with the proper milling cutter and cutting insert configurations, higher feed rates may be achieved with acceptable insert wear.

To further demonstrate that railway rails may be milled at high travel speeds while maintaining required rail finish and profile, according to the present disclosure, various milling cutter configurations were mounted to a test machine and used to mill an 11 foot segment of railway rail held in a rotary fixture to facilitate indexing for milling various facet angles on the rail. The test machine was equipped with a 35 horsepower horizontal machining center capable of a maximum linear feed rate of 400 inch per minute (IPM), or about 0.38 mph. In this test, two milling cutter and cutting insert geometries were evaluated using a 10-inch diameter cutter body configured to hold 32 cutting inserts.

A first milling cutter and insert configuration 100 evaluated is shown in FIGS. 5A-5C. In the first configuration 100, the milling cutter 110 comprises a neutral radial and a positive axial rake configuration 100. Referring to the radial view FIG. 5A and the plan views FIGS. 5B and 5C of configuration 100, the milling cutter 110 comprises a cutter body 112 defining a central diameter 114 and an outer circumference 116 extending outward a diameter "D". The central diameter 114 is positioned about a rotation axis "A", and the milling cutter 110 is dimensioned to mount to a spindle 132. The milling cutter 110 includes a plurality of holes 134 configured to receive bolts to fix the cutter body 112 to the rotation of the spindle 132. Those having ordinary skill in the art will appreciate that cutter bodies may comprise various arrangements of spindle fittings. For example, cutter bodies 112 may be designed with fittings including holes or slots configured for mounting to one or more spindle or spindle adaptor designs. As such, unless stated otherwise, the present disclosure is not limited by the particular spindle fitting arrangements in the illustrated embodiments.

The cutter body 112 extends to a cutter face 118 defining 32 cutting insert positions 120 about a periphery 122 of the cutter face 118. The cutting inserts, e.g., 124x, 124y, are secured within the insert positions 120. Each of the cutting inserts extends a distance from the cutter face 118 and defines a cutting edge 130 extending from the cutter face 118. The cutter body 112 is configured to be rotated about axis "A" in the rotational direction indicated by arrow "R". The views shown in FIGS. 5A-5C illustrate geometries of the cutting inserts 124x, 124y. Cutting insert 124y is shown at the six o'clock position in FIGS. 5A and 5B illustrating a wiper flat portion 40 extending 0.140 inches to an angled portion 42 (see cutting insert detail in FIG. 7), providing a 2° angle (measured between 144a and 144b). Cutting insert 124x is shown at the 3 o'clock position in FIGS. 5A and 5C illustrating a positive rake. It is to be appreciated that while cutting inserts 124x, 124y are referenced by different reference numbers, in various embodiments, inserts 124x, 124y, and the other insert mounted on the cutter body 112 may share the same or similar geometries and orientations.

Figure 6A:
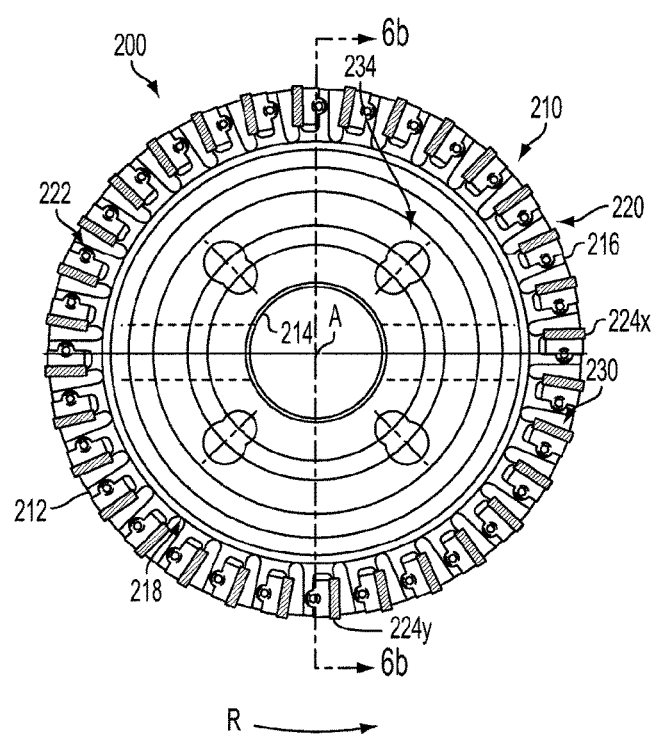
FIGS. 6A-6C illustrate certain components of a milling cutter according to various embodiments described herein.
Figure 6B:
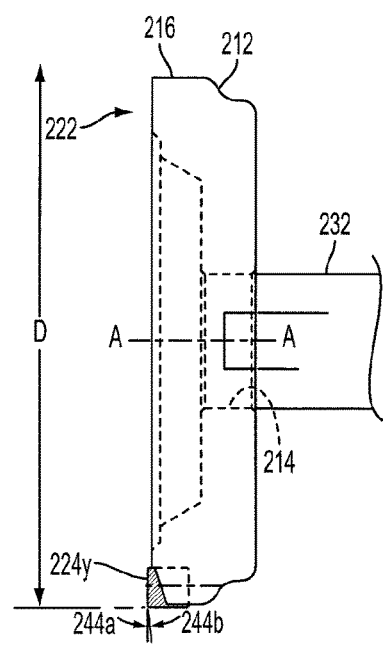
Figure 6C:
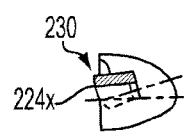

A second milling cutter and insert configuration 200 that was evaluated is shown in FIGS. 6A-6C. In the second configuration 200, the milling cutter 210 comprises a double negative (axial and radial) rake configuration 200. Referring to the radial view FIG. 6A and the plan views FIGS. 6B and 6C of the milling cutter 210, the milling cutter 200 comprises a cutter body 212 defining a central diameter 214 and an outer circumference 216 extending to a diameter "D". The central diameter 214 is positioned about a rotation axis "A" and is dimensioned to mount to a spindle 232. The cutter body 212 defines a plurality of holes 234 structured to receive bolts to fix the cutter body 212 to the rotation of the spindle 232. The cutter body 212 extends to a cutter face 218 defining 32 insert positions 220 about a periphery 222 of the cutter face 218. The cutting inserts (e.g., 224x, 224y) are secured within the insert positions 220, extend a distance from the cutter face 218, and include cutting edges 230. The milling cutter 200 is rotated in the rotational direction indicated by arrow "R". The radial view or side view of the milling cutter 210 illustrates geometries of the inserts 224x, 224y. In the views provided in FIGS. 6A and 6B, cutting insert 224y is shown at the six o'clock position illustrating a wiper flat portion 40 extending 0.140 inches to an angled portion 42 (see cutting insert detail in FIG. 7), providing a 2° angle (measured between 244a and 244b). Cutting insert 224x is shown at the 3 o'clock position in FIGS. 6A and 6C illustrating a negative rake. It is to be appreciated that while inserts 224x, 224y are referenced by different reference numbers, in various embodiments, inserts 224x, 224y, as well as other cutting inserts mounted on the cutter body 212, may share the same or similar geometries and orientations.

Figure 7:
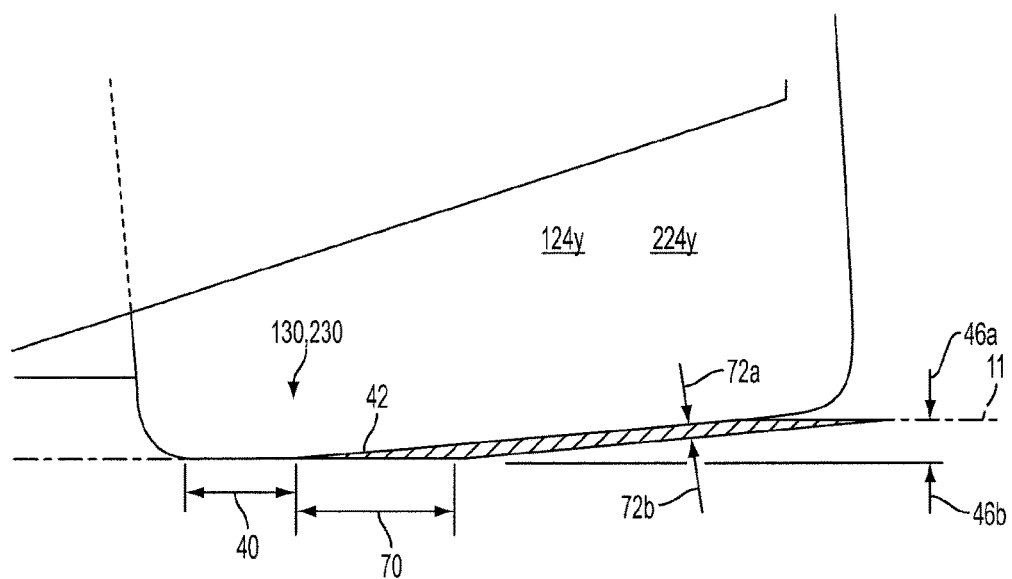
FIG. 7 is a semi-schematic view illustrating features of a milling insert according to various embodiments described herein.

As indicated, FIG. 7 provides a semi-schematic detail view of the cutting inserts 124y and 224y depicted in FIGS. 5A-5C and 6A-6C, respectively, and further illustrates the geometry of the cutting inserts and certain evaluated parameters. The cutting insert 124y, 224y is depicted in FIG. 7 engaging a railway rail 11, and the insert includes a wiper flat portion 40 transitioning to an angled portion 42. The programmed feed rate 70, actual chip load (between 72a and 72b), and maximum depth of cut (between 46a and 46b) indicated in FIG. 7 generally correspond to the test parameters, which are further described below.

Figure 8:
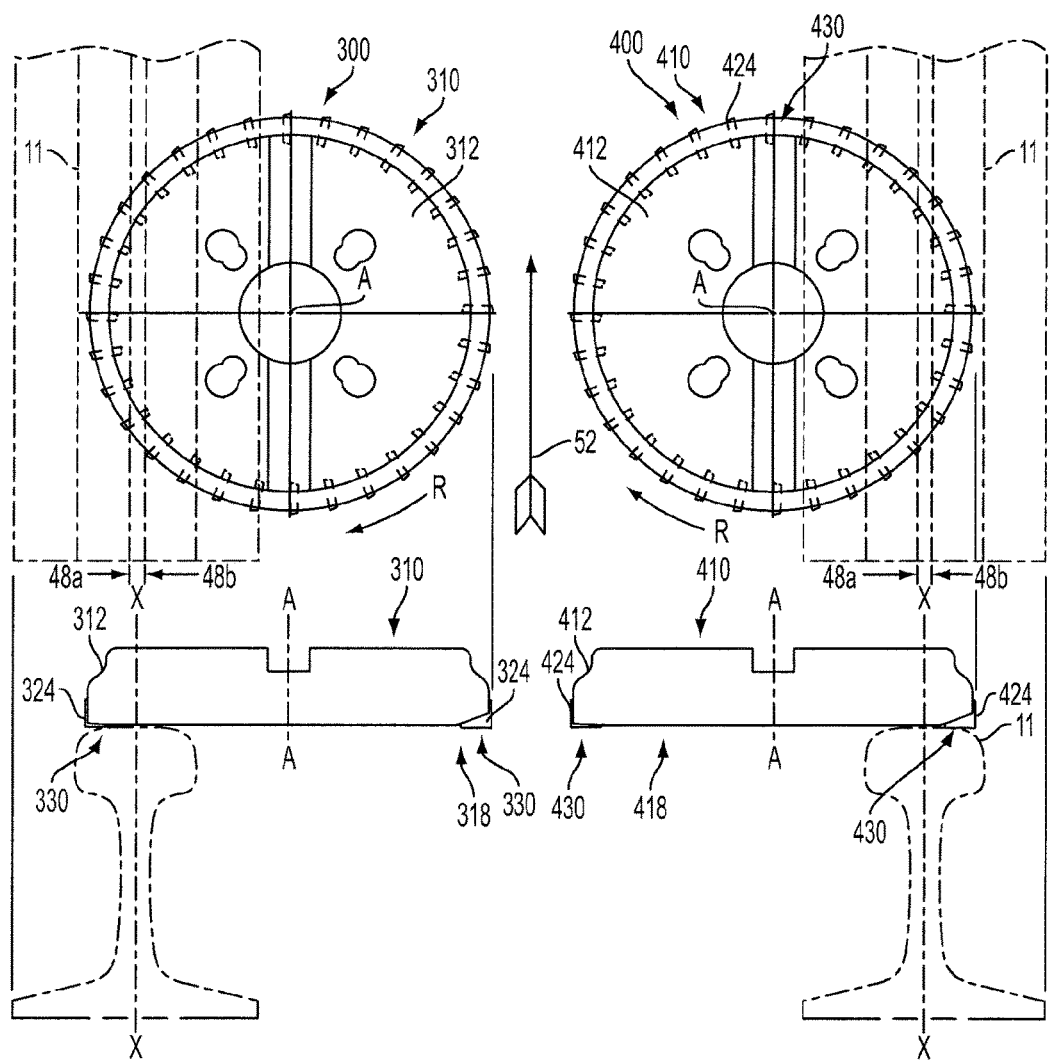
FIG. 8 illustrates the application of a conventional milling orientation and a climb milling orientation to the milling of railway rails according to various embodiments described herein.

In addition to evaluating milling cutter and cutting insert geometries, relative orientations between a milling cutter and a railway rail also were investigated. FIG. 8 illustrates a side-by-side comparison depicting "conventional" (up) milling 300 and "climb" (down) milling 400. The lower portion of the figure depicts milling cutters 310, 410, which may be applicable to any of the milling cutters described herein. Both milling cutters 310, 410 are positioned proximate to a rail 11. The cutter faces 318, 418 of the cutter bodies 312, 412 retain a plurality of cutting inserts 324, 424 comprising cutting edges 330, 430 positioned to mill the rail 11 when the cutter 310, 410 rotates in the direction of arrows "R" about rotation axis "A". The rail 11 may define an axis "X". According to certain embodiments, the rail 11 may be fed to the cutting inserts 324, 424 with the milling cutter 310, 410 traversing the rail, as indicated by arrow 52. In the upper portion of FIG. 8, the milling cutters 310, 410 are illustrated in an axial perspective from the spindle at the back of the milling cutter body 312, 412. In a "conventional" milling orientation 300, the chip thickness starts at or near zero and increases to a maximum to form the width of cut (measured between 48a and 48b). In a "climb" milling orientation 400, each cutting edge engages the material at a definite point and the width of cut (between 48a and 48b) starts at a maximum and decreases throughout the cut. In both orientations depicted in FIG. 8, the axis "A" of the milling cutter 310, 410 is offset from axis "X", as generally illustrated in FIG. 8. In various embodiments, however, the axis "A" of the milling cutter 310, 410 may be at least partially centered on axis "X" when the milling cutter 310, 410 is milling the rail 11.

Figure 9:
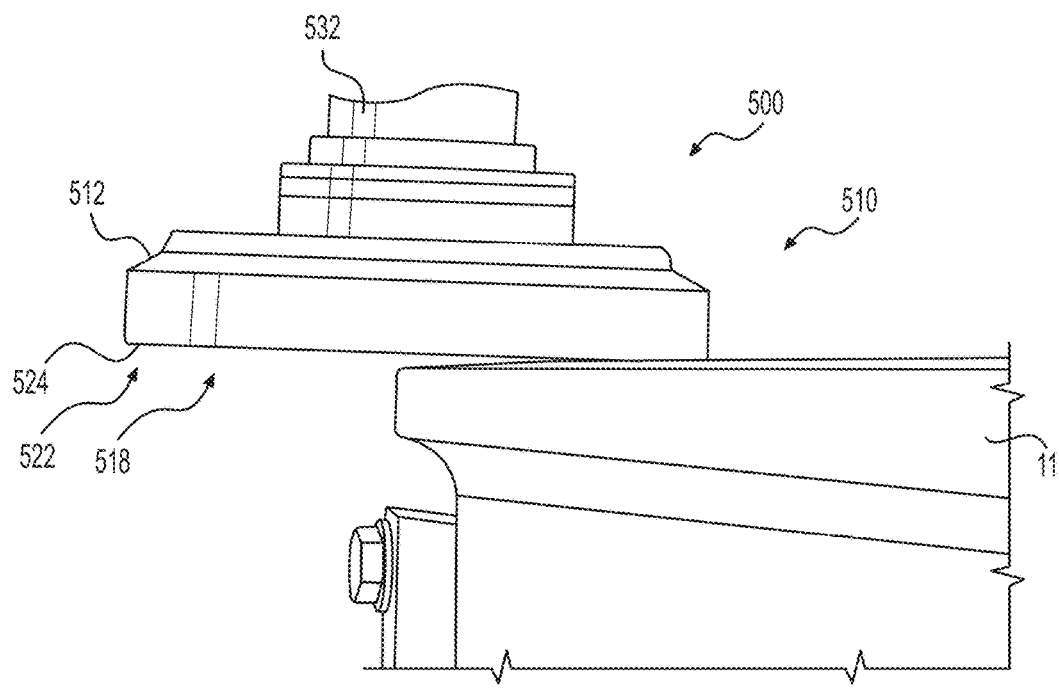
FIG. 9 is a photographic depiction of a milling cutter milling a railway rail according to various embodiments described herein.
Figure 10:
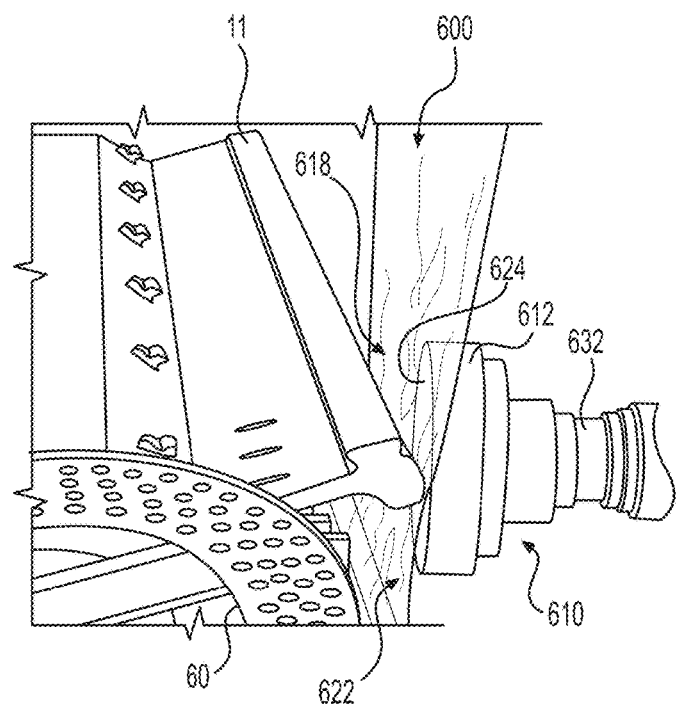
FIG. 10 is a photographic depiction of a milling cutter milling a railway rail according to various embodiments described herein.

FIG. 9 provides a photographic depiction of a milling cutter 510 coupled to a spindle 532 and performing work on a rail 11 in an offset orientation 500. In particular, milling cutter 510 comprises a cutter body 512 configured to house a plurality of cutting inserts 524 positioned about a periphery 522 of a cutter face 518 of the milling cutter 510. As introduced above, the milling cutter 510 may be positioned in either a conventional milling orientation or a climb milling orientation. As shown in FIGS. 8-9, the rotation axis "A" may be partially offset from axis "X", e.g., and the rotation axis "A" may be centered along the facet or width of cut as shown in FIG. 10. FIG. 10 illustrates a milling cutter 610 coupled to a spindle 632 and performing work on a rail 11 in a centered orientation 600. The milling cutter 610 comprises a cutter body 612 configured to house a plurality of cutting inserts 624 positioned about a periphery 622 of a cutter face 618 of the milling cutter 610.

As described above, to further demonstrate that rails 11 may be milled at high speeds while maintaining adequate rail finish and profile according to the present disclosure, milling cutters 110, 210, 310, 410, 510, 610 comprising the above cutter body/cutting insert configurations 100, 200 and orientations 300, 400, 500, 600 were mounted to a test machine providing a maximum linear feed rate of 400 IPM (inches per minute) to mill an eleven-foot long railway rail 11 held in a rotary fixture 60 (as shown in FIG. 10). The rotary fixture facilitates indexing the rail 11 for milling various facet angles on the rail 11. During the testing, the negative rake configuration 200 was observed to provide a better part finish at higher feed rates than the positive rake configuration 100. For example, compared to the positive rake configuration 100, the finish produced by the negative rake configuration 200 appeared less wavy at the higher feed rates. Notably, the negative rake configuration 200 cutting inserts 24 also offer additional cutting edges. Climb milling 400 with the milling cutter 410, 510 in an offset position 500 approximately 4 inches off center axis "A" was also found to provide a quieter cut with a better surface finish. FIG. 11 provides parameters of the testing, in which 32 test runs (G001-G0032) were conducted to evaluate the double positive milling cutter configuration 100 oriented on-center 600.

Figure 12A:
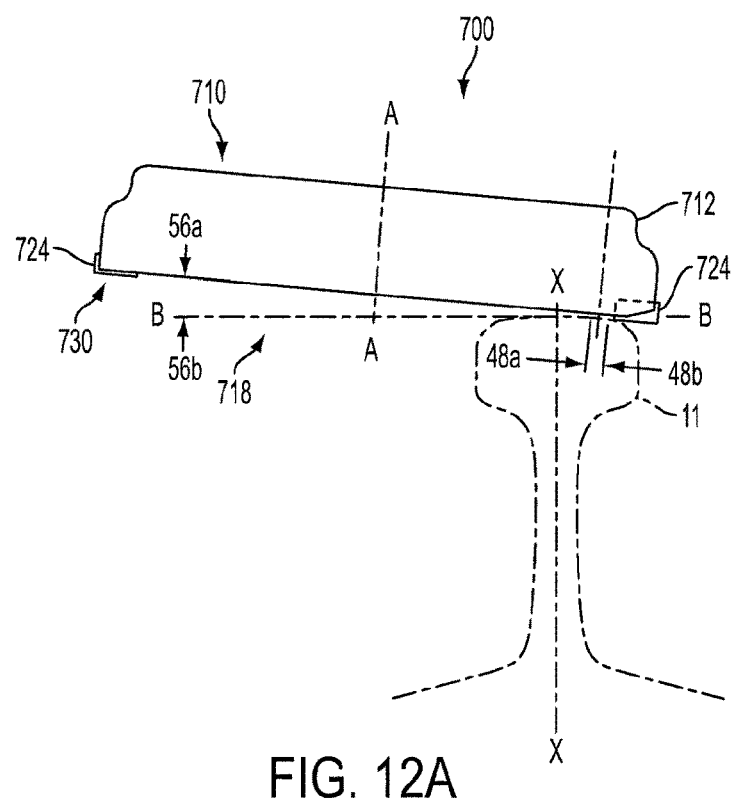
FIG. 12A schematically illustrates a milling cutter contacting a railway rail in an angled orientation according to various embodiments described herein.
Figure 12B:
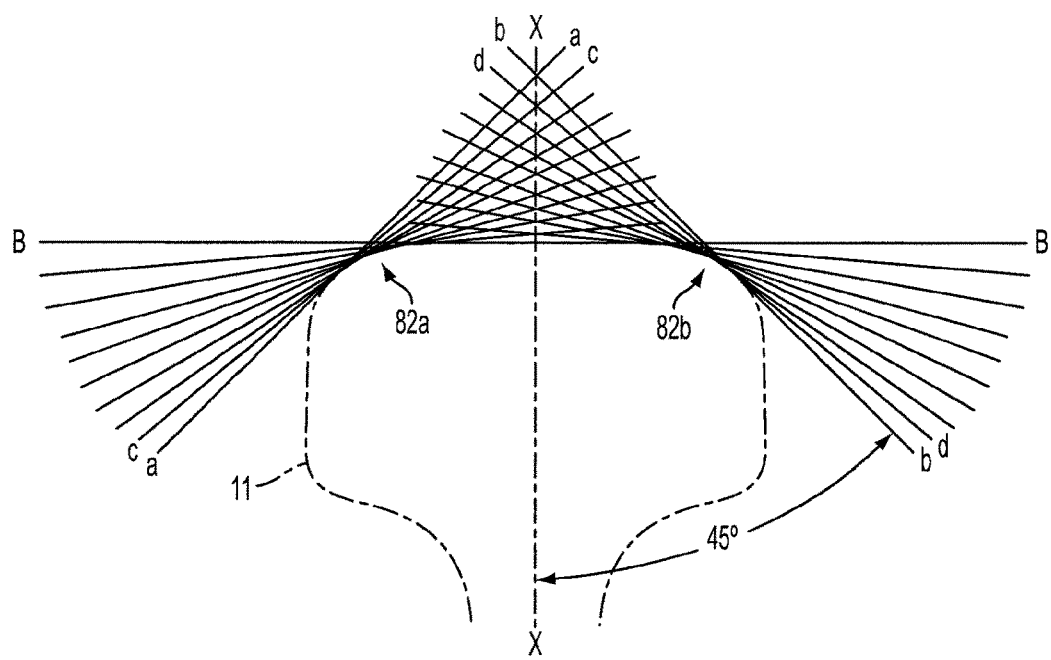
FIG. 12B illustrates various angled orientations of a milling cutter relative to a railway rail according to various embodiments described herein.

Referring to FIG. 12A, to address the various rail facets that may be milled in a rail to together provide a desired railhead profile, testing was conducted in which the milling cutter was positioned at various cutter tip angles 56a-56b off the horizontal "B" through approximately 45°. FIG. 12B illustrates nine examples of cutter tip angles off the horizontal "B" on both sides of the rail for profile or facet regions 82a, 82b on a rail 11. The nine set of facets (18 total facets) were milled on the rail 11 using configuration 100 or 200 to provide a desired rail profile or contour. During testing, the width of cut (measured between 48a and 48b) was approximately 0.12-1.12 inches, and the depth of cut was maintained between 0.005 and 0.010 inches (see, e.g., FIG. 7). Only four inserts where mounted on the cutter body to perform the test. Consequently, the work performed by each cutting insert was estimated to equate to about 3.03 mph at a full load of 32 inserts. Various features of the milling cutter 710 illustrated in FIG. 12A may be similar to the features of the milling cutter 410 illustrated in FIG. 8. For example, milling cutter 710 was positioned in an offset orientation 700. Accordingly, like features are identified by numbers corresponding to features of milling cutter 410 and, for purposes of brevity, are not further described.

Figure 13B:
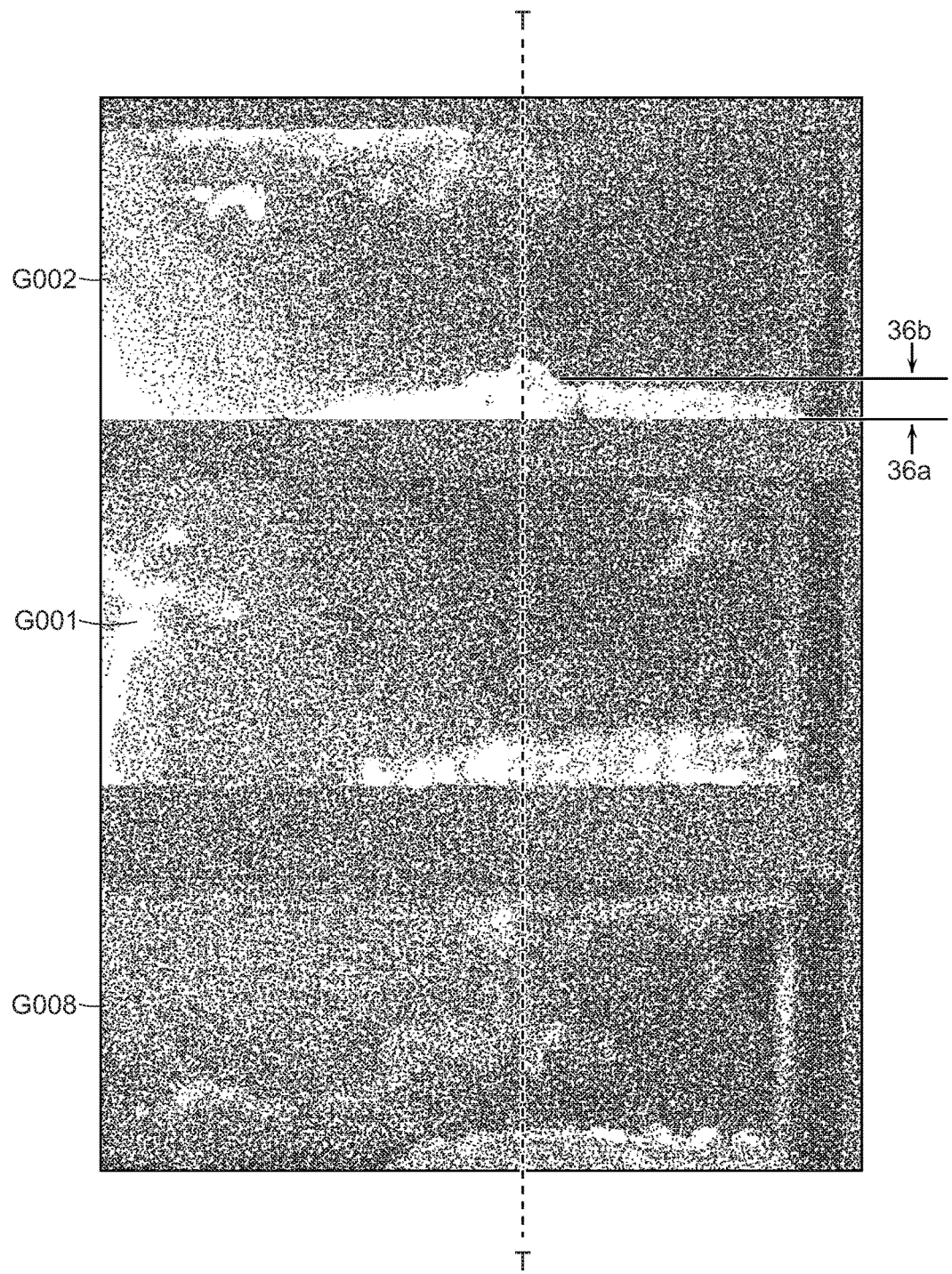
FIG. 13B is a photographic depiction of cutting inserts used in testing described herein.

As stated above, the maximum linear IPM feed for the test machine used in the test was 400 IPM. Accordingly, to further push linear feed evaluation, in mph, various test passes where run using only 1 or 2 cutting inserts. The parameters for these tests are provided in FIG. 13A. Both positive (Tests 1-7) and negative (Tests 8-10) milling cutter configurations 100, 200 were tested. A climb milling orientation 400 combined with an offset cutter-rail orientation 700 of 4 inches was used in all the tests. Width of cut was approximately 0.12-1.12, and the insert grade was Greenleaf® grade GA-5125 material, a CVD-coated C6 grade, available from Greenleaf Corporation, Saegertown, Pa. USA. The IPM feed was varied between 242.0 IPM and 400.4 IPM. The estimated mph feed with a full insert load of 32 inserts is between 4.83 mph and 12.00 mph. For example, for Tests 6 and 10, the programmed feed was run at 0.360 feed per insert (see, e.g., FIG. 7) at 1,100 RPM, reaching 396.0 IPM of linear feed with one insert. With a full load of 32 cutting inserts run at an equivalent inch per insert feed rate, the estimated mph feed is about 12 mph. FIG. 13B is a photographic depiction of cutting inserts used in tests G008, G001, and G002. The insert tops or rake faces showed no damage and only flank wear was visible. The wear land (between 36a and 36b) for the G002 insert was measured to about 0.025 inches. Notably, increased wear was observed at the 2° wiper flat transition (generally at line T-T). It is believed that addition of a radius to the cutting insert may reduce the observed increase in wear in this region.

Figure 22:
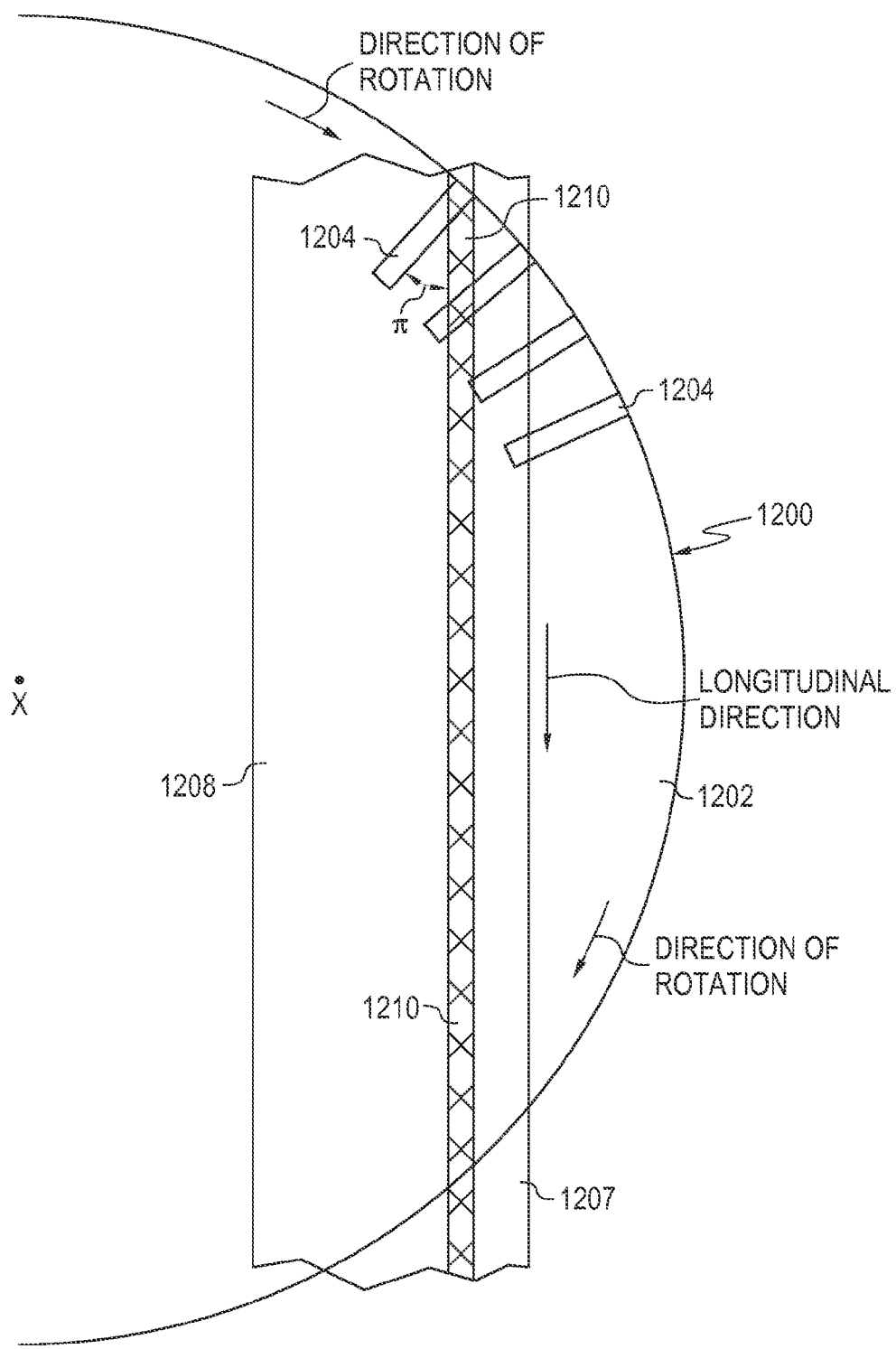
FIG. 22 schematically illustrates aspects of a non-limiting embodiment of a method of milling segments of a desired profile on a railway rail as the milling cutter traverses the railway rail.

One non-limiting embodiment of a technique for milling a desired profile, portion of a profile, or "facet" on a surface of a railway rail while traversing the rail may be better understood by referring to FIG. 22, which schematically depicts a milling cutter 1200 including a cutter body 1202 rotatable about a rotation axis "X". FIG. 22 depicts the periphery of the cutter body 1202 in phantom, looking downward onto the rail surface being machined, and indicates the positions of several of the many milling inserts 1204 secured to the cutter body 1202 about a periphery of a cutter face of the cutter body 1202. Cutter body 1202 is shown face milling a region of a top surface 1207 of a railway rail 1208 to produce a desired rail profile portion or facet 1210 extending longitudinally along the top surface 1207 of the railway rail 1208. The facet 1210 may be one of several facets milled onto the top surface 1207 of the railway rail 1208 to provide a desired rail profile and thereby re-profile the top surface 1207. The cutter body 1202 rotates about a rotation axis "X" in the rotational direction shown in FIG. 22 (clockwise as seen from the perspective of FIG. 22) as the cutter body 1202 also traverses longitudinally along the railway rail 1208. Thus, the motion of the milling inserts 1204 relative to the top surface 1207 of the railway rail 1208 is a result of both the rotational motion of the cutter body 1202 about rotational axis X and the motion of the cutter body 1202 in the illustrated longitudinal direction along the railway rail 1208.

As will be understood from FIG. 22, the milling cutter 1200 may be positioned so that a milling insert 1204 enters a cut being machined on the top surface 1207 of the railway rail 1208 at a desired approach angle. One such approach angle is an angle π, which is defined as the angle between a cutting edge of the milling insert and the longitudinal axis of the railway rail top surface. In certain embodiments, the angle π preferably is in a range of from 20° to 50°. Each milling insert 1204 preferably sweeps down the railway rail 1208 as the milling cutter 1202 rotates and longitudinally traverses the rail 1208 in a manner that utilizes the entire or nearly the entire cutting edge of the milling insert 1204 to mill material from the rail 1208, thereby distributing heat and wear over the entire or nearly the entire cutting edge of the milling insert 1204. The movement of milling inserts 1204 relative to the top surface 1207 of the rail 1208 creates a shearing action down the rail 1208, continuously removing material to form the desired facet 1210 along the top surface 1207.

Figure 23:
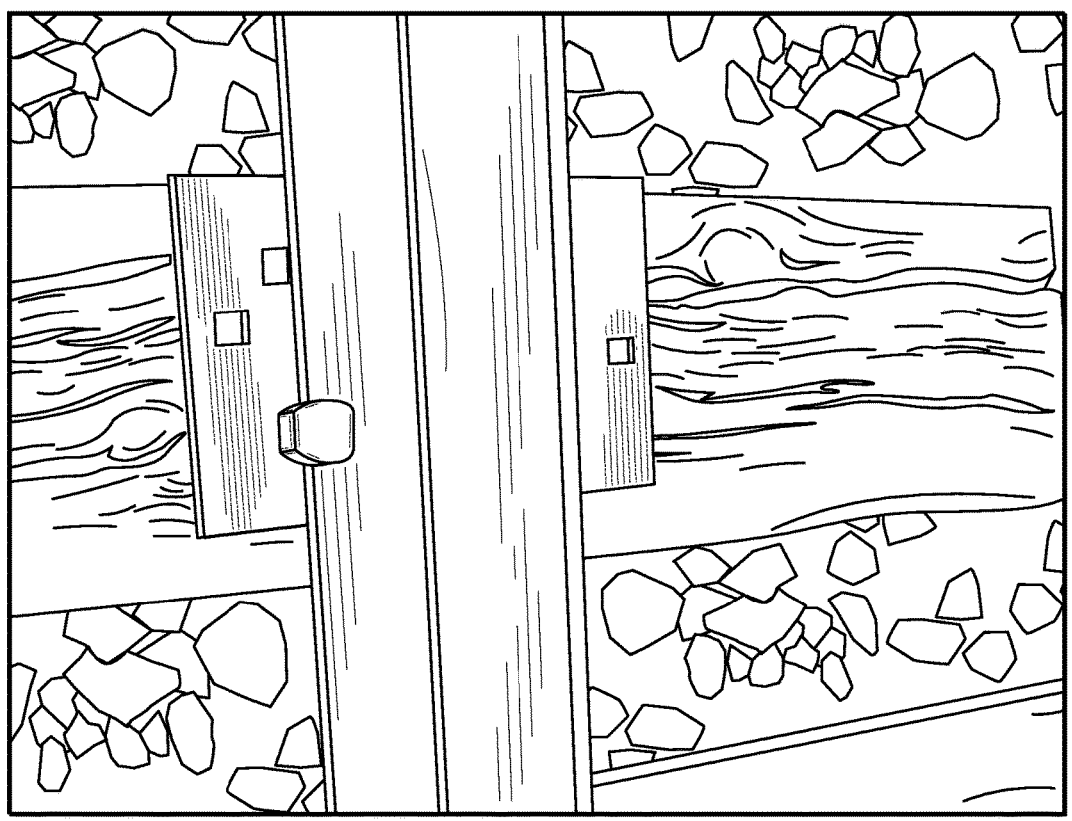
FIG. 23 is a photographic depiction of a railway rail including a milled segment (facet) formed by a non-limiting method according to the present disclosure.

Again referring to FIG. 22, in certain non-limiting embodiments of the method described in connection with that figure, in addition to providing an angle π in the range of 20° to 50°, the rotational speed of the cutter body 1202 is adjusted so as to avoid forming a facet composed of a pattern of mill markings or "cross hatches" extending across the facet at an angle that is generally 90° relative to the longitudinal axis of the railway rail 1208. Milling a facet along a railway rail in a way that produces such a mill marking pattern may increase machining pressure and adversely affect cutting insert life and rail surface finish. One example of a desirable mill marking pattern for a facet milled on a top surface of a railway rail according to the present disclosure is shown in FIG. 23, wherein the mill markings in the facet formed by the milling method extend across the facet at an angle of approximately 45° relative to the longitudinal axis of the railway rail. As depicted in FIG. 23, the left side of the railway rail is the inside edge, also known as the "gage side", which guides the wheels of the locomotive and rail cars. The outside of the rail, also known as the "field side", may not require re-profiling as it does not normally guide the wheels.

Figure 14B:
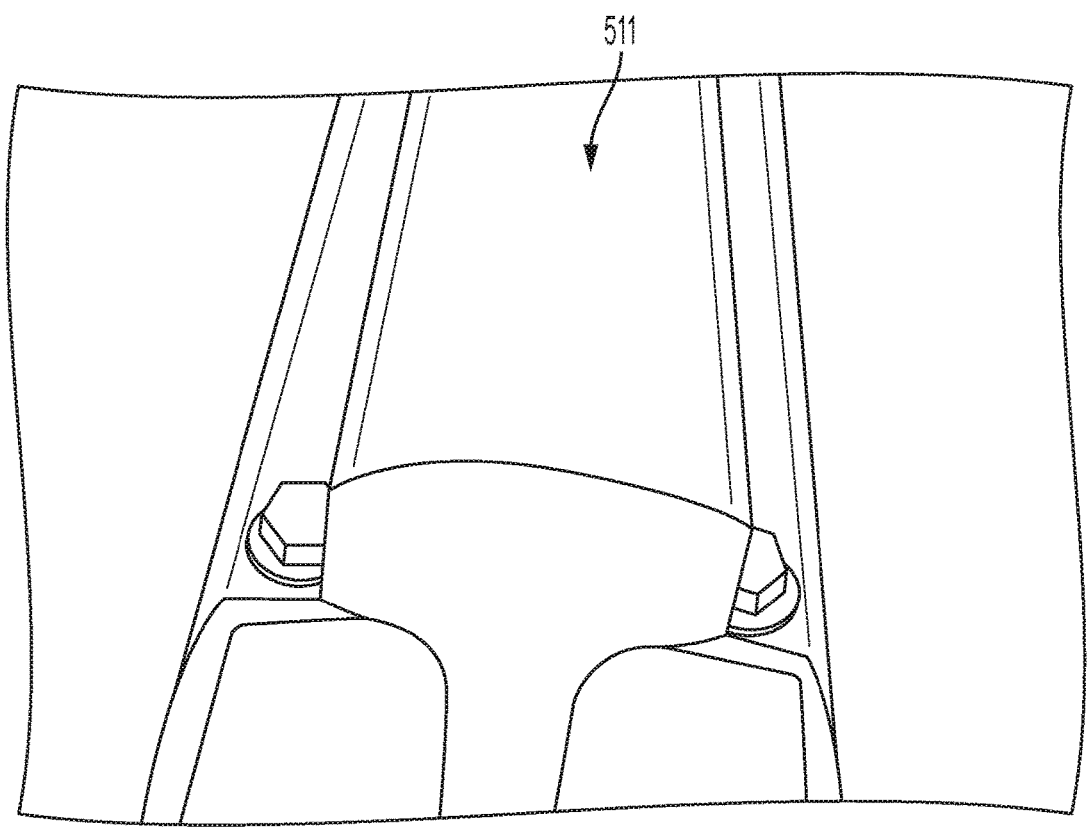
FIG. 14B is a photographic depiction of a rail re-profiled in testing described herein.

FIG. 14A provides test parameters used to evaluate two coated cemented carbide cutting insert grades: Greenleaf® grade GA-5125 (Test 1) and Greenleaf® grade G-955 (Test 2), both of which are available from Greenleaf Corporation, Saegertown, Pa., USA. For Tests 1 and 2, the milling cutter 210 included only a single cutting insert 24 in a negative rake configuration 200. A climb milling orientation 400 was used in both tests, and the milling cutter was oriented at a cutter-rail offset 700 of 4 inches. The programmed feed per insert at 825 RPM was 0.360, reaching 297 IPM linear feed with the single insert. The equivalent mph feed with a full insert load of 32 cutting inserts is estimated to be about 9.00 mph. Width of cut was approximately 0.12-0.5 inches. FIG. 14B is a photographic depiction of a rail 511 re-profiled in the test, evidencing acceptable part finish.

Figure 16:
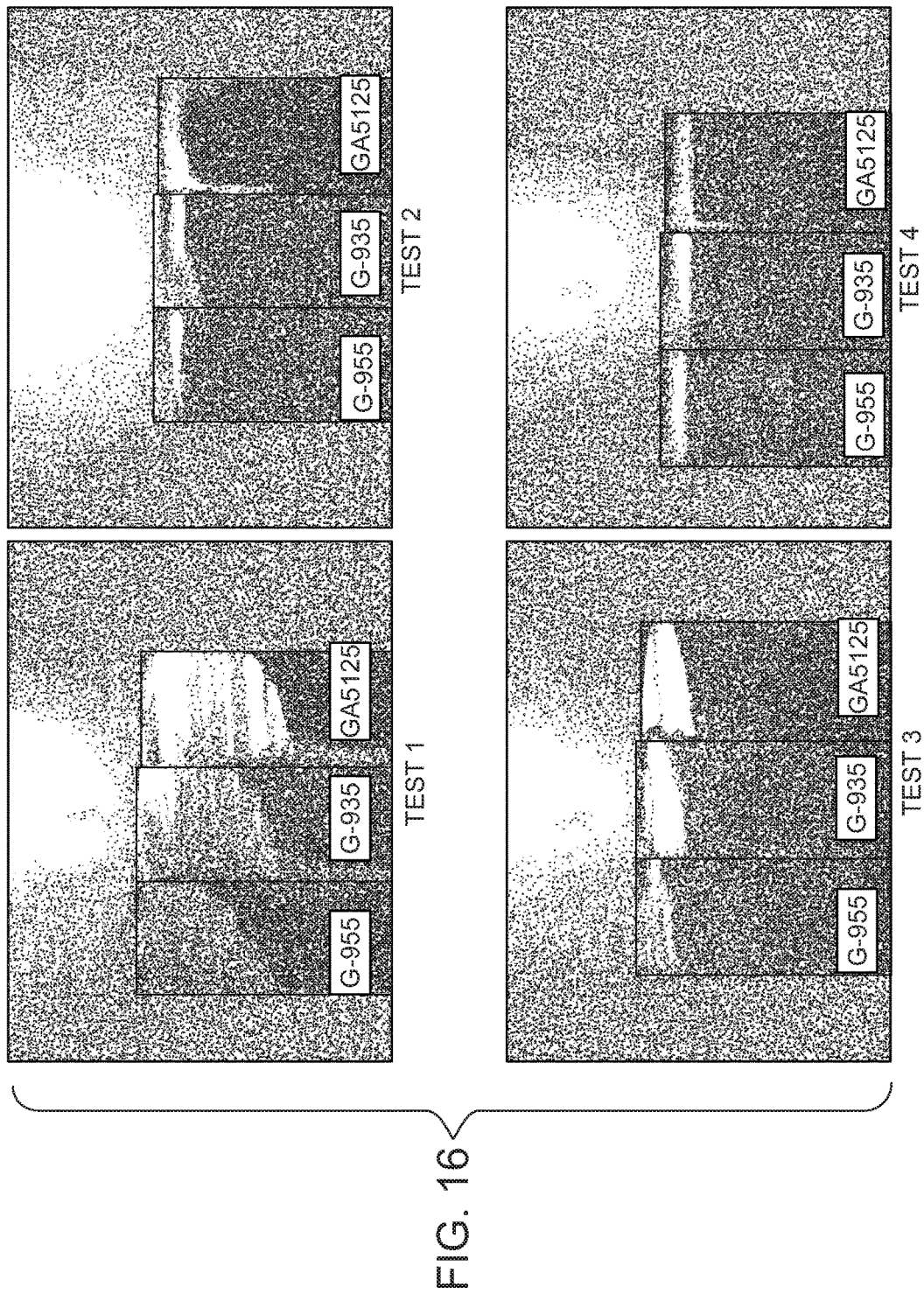
FIG. 16 provides photograph depictions of various cutting inserts used in testing described herein.

To further evaluate insert grades at an increased width of cut, additional tests were performed using cutter configuration 200 and three coated cemented carbide insert grades: Greenleaf® grade GA-5125, Greenleaf® grade G-935, and Greenleaf® grade G-955, all of which are available from Greenleaf Corporation, Saegertown, Pa., USA. The parameters for this test are provided in FIG. 15. Cutting inserts composed of each grade were run in the same milling cutter for the same time for comparison purposes. The depth of cut was 0.060 inches and the width of cut was maintained at approximately 2.50 inches. FIG. 16 is a photographic depiction of the cutting inserts of each grade showing the most wear from each of the four tests. The cutting inserts from Test 1 exhibited the most wear and indicated that for certain cutting inserts, as the width of cut increases, a corresponding decrease in insert life may be observed. Thus, in various embodiments, a plurality of milling cutters may be positioned such that one or more of the milling cutters re-profiles a railway rail along a small facet or width of cut. Accordingly, as described in more detail below, a milling cutter apparatus according to the present disclosure may comprise a rail vehicle having mounted thereto a plurality of milling cutters configured to mill a plurality of facets to together define a desired rail profile. Comparing the cutting inserts from Test 1 with the cutting inserts from Tests 2-3 also shows that, as cutting speeds increase, a corresponding decrease in cutting insert life may be observed. Thus, in various embodiments, the plurality of milling cutters may be positioned such that one or more of the milling cutters are positioned to re-profile a rail with a narrow facet and at a reduced RPM.

Figure 17C:
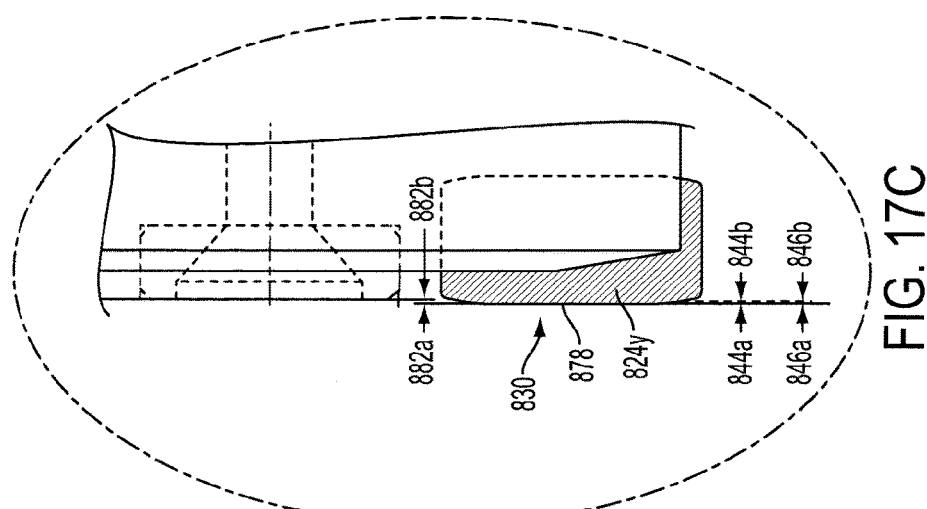
FIGS. 17A-17C schematically illustrate certain features of a milling cutter according to various embodiments described herein.
Figure 17B:
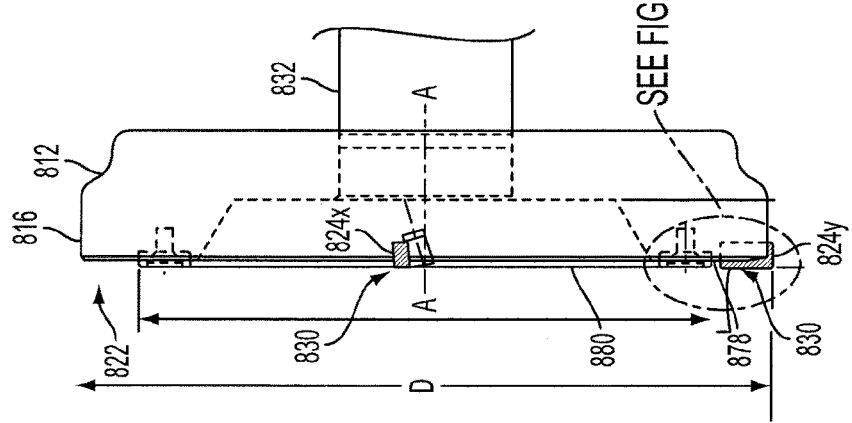
Figure 17A:
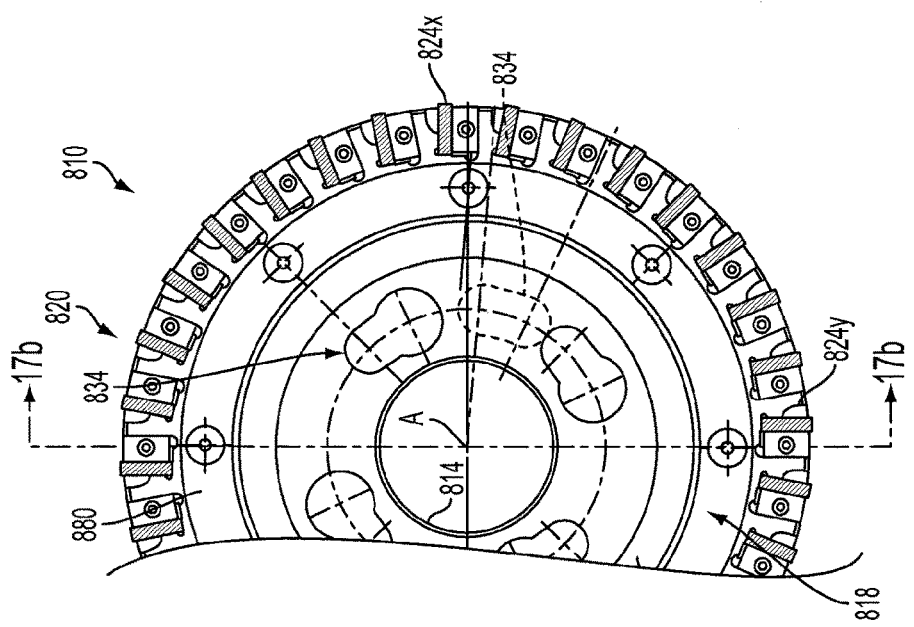

Referring to FIGS. 17A-17C, which provide an axial view FIG. 17A and a radial view FIG. 17B (a portion of which is magnified in the view provided in FIG. 17C of a milling cutter 810, the milling cutter 810 comprises a cutter body 812 defining a central diameter 814 and an outer circumference 816 defined by diameter "D". The central diameter 814 is positioned about a rotation axis "A" and is dimensioned to mount to a spindle 832. The cutter body 812 defines a plurality of holes 834 configured to receive bolts to fix the cutter body 812 to the rotation of the spindle 832. The cutter body 812 extends to a cutter face 818 defining 32 insert positions 820 about a periphery 822 of the cutter face 818. The cutting inserts, e.g., 824$x$, 824$y$, are secured within the insert positions 820. The cutting inserts 824$x$, 824$y$ extend a distance from the cutter face 818 to define cutting edges 830 extending therefrom, and the milling cutter 810 is configured to be rotated in the rotational direction indicated by arrow "R". The radial view or side view of the milling cutter 810 illustrates geometries of the inserts 824$x$, 824$y$. In the views provided in FIGS. 17A-17C, cutting insert 824$y$ is shown at the six o'clock position illustrating a substantially linear portion 878 of the insert 824$y$ presented at the cutter face 818. Angle 844$a$-844$b$ comprises about a 0° angle. Depth of cut is illustrated between 846$a$-846$b$. Cutting insert 824$x$ is shown at the 3 o'clock position in FIGS. 17A and 17B illustrating a negative rake. It is to be appreciated that while inserts 824$x$, 824$y$ are referenced by different reference numbers, in various embodiments, cutting inserts 824$x$, 824$y$, as well as other cutting inserts mounted on cutter body 812, may share the same or similar geometries and orientations.

The milling cutter illustrated in FIGS. 17A-17C also comprises a bumper plate 880 positioned at the cutter face. In various embodiments, a bumper plate 880 may be positioned adjacent to one or more cutting inserts, e.g., 824$x$, 824$y$, between an inner circumference of the milling body and the periphery 822 of the cutter face 818, to protect the cutter body and the inserts from wear and breakage due to excessive depth of cut. The bumper plate 880 may also provide a hard stop to limit the depth of cut from exceeding a maximum value. For example, in one embodiment, a differential in axial extension of the bumper plate 880 and the cutting insert 824$ax$, 824$y$ may be defined between 882$a$-882$b$. This distance may be greater than the desired depth of cut 846a-846b. It is to be appreciated that any of the milling cutters disclosed herein may comprise a bumper plate. Additionally, it is contemplated that a bumper plate may comprise a modular component that may be added when needed and then removed after use. In certain embodiments, multiple bumper plates may be provided for a particular milling cutter. Bumper plates may comprise various thicknesses or may be configured to be adjustable via shims, for example. Bumper plates may also comprise rings or discs extending about a circumference of the cutter face 818. Bumper plates may comprise other shapes and configurations such as segmented plates or segmented rings, for example. In various embodiments, the bumper plate comprises a ring including a rigid material to protect the cutter body. In certain embodiments, the bumper plate comprises a rigid metallic material or a rigid polymer or ceramic.

Figure 18B:
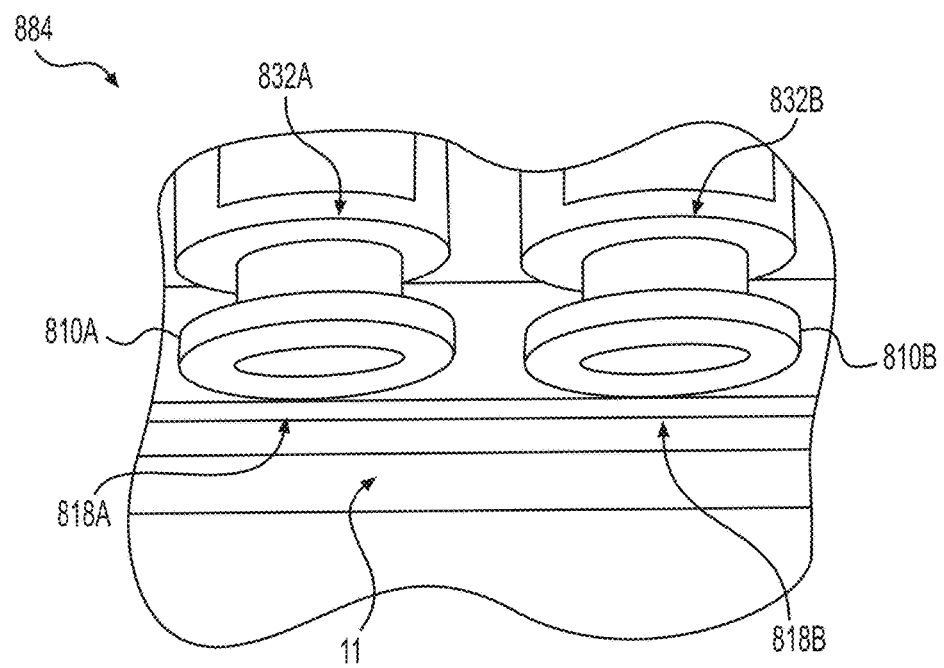
FIG. 18B is a photographic depiction of a test carriage including two milling cutters that was used in testing described herein.

Cutting insert wear is an important aspect that must be considered in a railway rail re-profiling method. When cutting inserts wear beyond a certain level, they must be indexed or replaced. In some instances, indexing or replacement may be a time-consuming process, and may further increase the time that a railway segment is out of service. To further evaluate insert wear, additional tests were performed using the milling cutter configuration illustrated in FIGS. 17A-17C. In addition to providing the configuration described above with respect to FIGS. 17A-17C, the inserts 824x, 824y received an edge preparation comprising a 0.015-0.020 inch land and a 0.002-0.003 inch hone. The test included mounting the milling cutter to a test carriage to re-profile a length of railway rail in situ. FIG. 18A provides the parameters used for the testing. FIG. 18B is a photographic depiction of a portion of the test carriage 884. The test carriage 884 comprised two milling cutters 810a, 810b mounted to spindle 832a, 832b, respectively. The cutter faces 818a, 818b are visible. The milling cutters 810a, 810b were separately angled and disposed in an offset orientation with respect to the rail 11 to mill segments of a profile on the rail.

FIGS. 19A-19C are a photographic depictions of the cutting inserts used in Tests 4-8 referenced in FIG. 18A. The right panel, includes cutting edges (shown toward the top of the page) for 16 cutting inserts, representing 8 cutting inserts for each milling cutter (although the milling cutter was equipped to hold 32 cutting inserts). As can be seen from FIGS. 19A-19C, the same cutting insert cutting edges could be run much farther until indexing was necessary. The finish of the rails following re-profiling using the apparatus and method as described herein was determined to be acceptable. The top left panel depicts a magnified view of cutting insert 924. The indicated portion of the cutting edge 930 is further magnified in the lower left panel, which shows the top 925 of the cutting insert 924. The edge prep is indicated between 927a-927b. The wear land (between 936a-936b) was approximately 0.010-0.015 inches. As understood to those having ordinary skill, a wear land is a flattened worn area on a cutting insert cutting edge that forms due to abrasive wear from contacting a workpiece (such as, e.g., a railway rail). It is believed that as wear lands increase, the milled surface finish of the rail may deteriorate, and cutting pressures and power consumption may also increase. Due to the unique nature of the disclosed apparatuses and methods, wear lands may be able to increase to 0.04 inches and beyond before adverse affects require a cutting insert to be indexed or replaced.

Referring to FIGS. 20A and 20B, according to various embodiments, a milling cutter 910 comprises a bumper ring 990 positioned about the cutter face 918. The milling cutter 910 may comprise features similar to any of the milling cutters disclosed herein. Accordingly, similar features are identified by similar reference numbers and, for the sake of brevity, will not be repeated. The bumper ring 990 comprises a ring extending about a circumference of the milling cutter 910, outward of the periphery of the cutter face 922 housing the cutting inserts. For example, a radial distance between a cutting insert 924 and the rotation axis "A" is shorter than a radial distance between the bumper ring 990 and the rotation axis "A". In addition to a bumper ring 990, the milling cutter 910 also comprises a bumper plate 980 positioned at the cutter face. In various embodiments, a bumper plate 980 may be positioned adjacent to one or more cutting inserts, e.g., cutting inserts 924x, 924y, between an inner circumference of the milling body and the periphery 922 of the cutter face 918, to protect the cutter body 912. The bumper ring 990 may provide a hard stop to limit the depth of cut from exceeding a maximum value, such as when traversing transitions, gaps between rails, or mushroomed joints. In one embodiment, a differential in axial extension of the bumper ring 990 and the cutting insert 924ax, 924y may be defined between 992a and 992b. This distance may be greater than the desired depth of cut and, when the milling cutter 910 is also equipped with a bumper 980, the axial extension of the insert 924x, 924y may be greater than both the bumper plate 980 and the bumper ring 990. It is to be appreciated that any of the milling cutters disclosed herein may comprise a bumper plate 980 and/or a bumper ring 990. In some embodiments, the bumper plate 980 and/or the bumper ring 990 may be modular. For example, the bumper ring 990 may be removable or customizable. In one embodiment, shims may be placed between the bumper ring 990 and the cutter body 912 at position 994 to increase the axial extension of the bumper ring 990. It is contemplated that the bumper ring 990 may comprise a modular component. The modular component may be added when needed or removed when not needed. In certain embodiments, multiple bumper rings 990 may be provided to suit a desired milling cutter. Bumper rings 990 may comprise various thicknesses or may be configured to be adjustable via shims, for example. Bumper rings 990 may also comprise rings, plates, or discs extending about a circumference of the cutter face 918. Bumper rings may also comprise segmented rings, plates, or discs. In various embodiments, the bumper ring comprises a ring comprising a rigid material to protect the cutter body. In one embodiment, the bumper plate comprises a rigid metallic material or a rigid polymer or ceramic.

Figure 21:
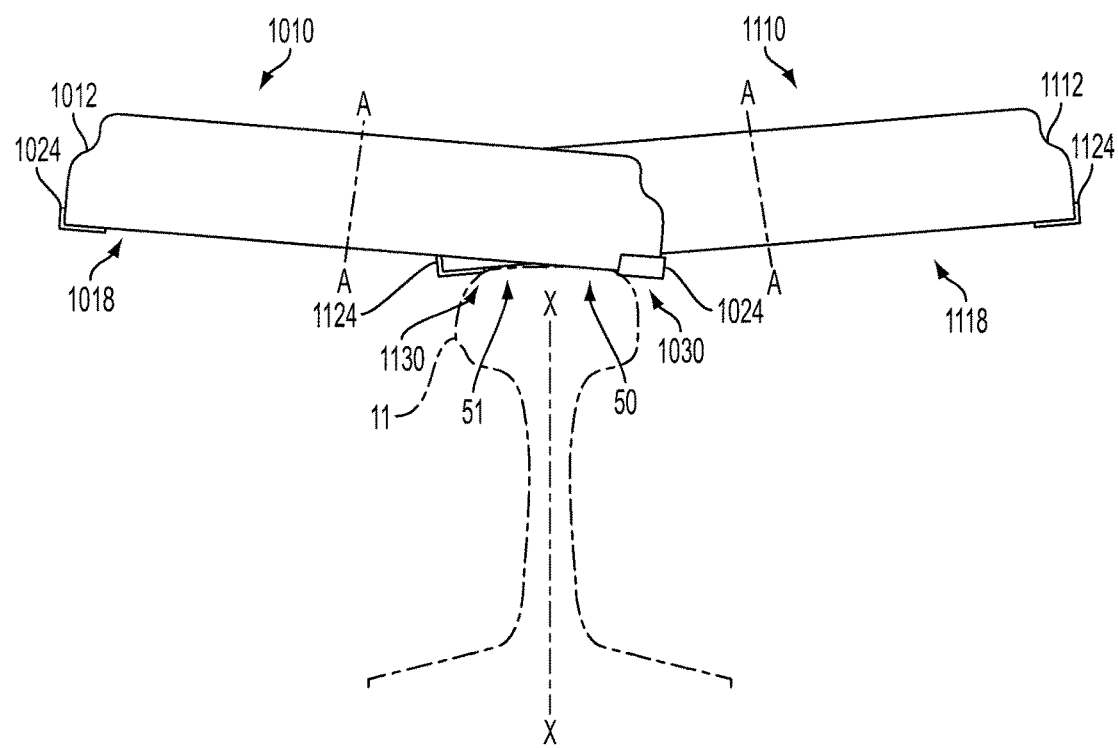
FIG. 21 schematically illustrates an arrangement of a plurality of milling cutters orientated about a railway rail to each define a separate portion or region of the rail profile according to various embodiments described herein.

FIG. 21 illustrates a first milling cutter 1010 and a second milling cutter 1110, each comprising a cutter body 1012, 1112 having a plurality of cutting inserts 1024, 1124 disposed along the periphery of a cutter face 1018, 1118. The cutting inserts define cutting edges 1030, 1130 configured to engage the rail 11 to form a rail profile. Both milling cutters 1010, 1110 are positioned in an offset orientation such that the rotation axis "A" is offset from the axis "X" of the rail and the work. In operation, the first and second milling cutters 1010, 1110 rotate about their respective rotation axes "A" and may traverse the rail 11 at speeds of 1 mph or more. The rotation of the milling cutters 1010, 1110 may pass the cutting edges 1030, 1130 of the cutting inserts 1024, 1124 over the rail 11 such that each sequentially engages the rail to remove a portion of rail material. As shown, multiple milling cutters 1010, 1110 may be positioned about the rail 11. One or more of the milling cutters 1010, 1110 may be positioned in different angular orientations with respect to the rail 11. Thus, in certain embodiments, a plurality of milling cutters may be positioned in differing orientations about the rail 11 to mill a plurality of facets (i.e., profile regions or segments) along the rail and thereby provide the desired rail profile. In FIG. 21, the first milling cutter 1010 forms a facet along the rail at a position generally indicated by arrow 50, while the second milling cutter 1110 forms a facet along the rail 11 at a position generally indicated by arrow 51. In various embodiments, multiple milling cutters 1010, 1110 may be positioned proximate to multiple tracks and may be mounted on the same or multiple rail vehicles. For example, in one embodiment, one or more large diameter milling cutters are mounted to a first rail vehicle and one or more smaller diameter milling cutters are mounted to the first rail vehicle in a different position or are mounted to a second rail vehicle. The large diameter milling cutters may perform the majority of the work on open rail, while the small diameter milling cutters may be engaged for tighter working conditions, such as near transitions or at grade crossings.

In various embodiments, a method of profiling a rail comprises positioning a pair of milling cutters 1024, 1124 proximate to the rail 11, traversing the rail 11, engaging the rail 11 with cutting edges 1030, 1130, and milling the rail 11. For example, a first milling cutter 1024 may be positioned at a first angle and a second milling cutter 1124 may be positioned at a second angle relative to the rail. In one embodiment, the first milling cutter 1024 is positioned proximate to one side of the rail at a first angle to the rail, the second milling cutter 1124 is positioned proximate to the other side of the rail at a second angle to the rail, and the first and second angles are substantially the same (e.g., a-a, b-b in FIG. 12B). Accordingly, the pair of milling cutters 1024, 1124 may be positioned to mill a set of matched facets along both sides of the rail. In one such embodiment, multiple pairs of milling cutters may be positioned along the rail 11 such that each pair mills a set of matched facets while traversing the rail 11. In one embodiment, the pairs of milling cutters are positioned to progressively or sequentially mill the rail from a lower portion of the profile to a higher portion of the profile. For example, with reference to FIG. 12B, a first pair of milling cutters may be positioned to mill matched facets a-a, b-b, and a second pair of milling cutters may be positioned to mill matched facets c-c, d-d. In one embodiment, as the rail vehicle moves along the rail 11, a first pair of milling cutters engages the rail and mills a first matched set of facets, a second pair of milling cutters engages the rail 11 and mills a second set of matched facets, and a third pair of milling cutters engage the rail 11 and mills a third set of matched facets. The first set of matched facets may be located below the second set of matched facets, and the second set of matched facets may be positioned below the third set of matched facets. In one such embodiment, the first set of matched facets is milled before the second set of matched facets (as the re-profiling vehicle traverses the rail), and the second set of matched facets is milled before the third set of matched facets. Accordingly, in one embodiment, a method of re-profiling a railway rail 11 comprises positioning a plurality of milling cutters proximate to the rail 11 such that the plurality of milling cutters sequentially mills sets of matched facets from a lower portion of the rail to a higher portion of the rail. Because the width of the rail being re-profiled will generally be much less than the diameters of the milling cutters, pairs of milling cutters will typically be spaced apart on one or more re-profiling vehicles along a length of rail. For example, milling cutters may be staggered along one or both sides of a rail. Also, it will be understood that unpaired milling cutters (i.e. milling cutters not part of a set) may be employed in the methods and apparatuses according to the present disclosure. Accordingly, in certain embodiments, one or more unpaired milling cutters may be mounted on a carriage or other rail vehicle to mill portions or segments of a profile into a rail in situ, and such carriage or vehicle may or may not also include paired sets of milling cutters mounted thereon.

In various embodiments, milling cutters used according to the present disclosure may include cutting inserts comprising uncoated cemented carbide grades, such as, for example, C6 carbide, or coated cemented carbide grades, such as, for example, coated C6 carbide. Coated carbide grades may be selected from, e.g., PVD or CVD coated carbides. In various alternate embodiments, milling cutters used according to the present disclosure may include cutting inserts comprising uncoated ceramic grades (for example, Greenleaf® WG-300 material) or coated ceramic grades (for example, Greenleaf® WG-600 material).

According to various embodiments, a face milling cutter including a set of 8 cutting inserts mounted thereon may be rotated on a milling cutter at 300 RPM and advance along a railway rail at 1 mph for at least 18,000 feet (ft), 27,000 ft, or farther before requiring indexing or replacement of one or more of the cutting inserts. In a further embodiment, because wear is generally proportional to work performed by the cutting tool, a similar milling cutter configuration comprising a load of 32 cutting inserts may run at 300 RPM and advance along a railway rail at 4 mph for a distance of 108,000 ft (20.45 miles) before requiring indexing or replacement of one or more of the cutting inserts.

As described above, another factor in regard to cutting insert life is depth of cut. As disclosed herein, maintaining depth of cut to around 0.005-0.010 inches may beneficially increase cutting insert life as well as adequately re-profile railway rails without significant removal of material that may otherwise unacceptable shorten the operational life of the rail. However, in various embodiments, it may be desirable or necessary to increase depth of cut beyond 0.010 inches, for example to 0.040 inches or more. In certain embodiments, the method may involves controlling the depth of cut of the cutting inserts to a depth no more than 0.040 inches, no more than about 0.010 inches, or between 0.005 inches and 0.010 inches.

Accordingly, unless stated otherwise, the present disclosure is not limited to a 0.0010 inch depth of cut or any other depth of cut described herein.

Also, as described above, one factor to consider in regard to cutting insert life is facet width or width of cut. For example, maintaining facet width on the rail to a minimum, such as 0.31 inches or less in some instances, may result in enhanced cutting insert life. Also, for example, in certain embodiments the width of cut may be limited to about 0.625 inches or less when milling a segment or portion of a profile on a rail.

According to various embodiments, the thickness of cutting inserts may beneficially increase the operational life of the cutting inserts. For example, because the wear land will increase dramatically as the cutting edge in one area progresses down the length of the cutting insert, increasing a thickness of the cutting inserts may allow further utilization all cutting edges.

In various embodiments, a milling cutter may be configured to enhance cutting insert life in railway rail re-profiling applications. For example, whereas a cutting insert comprising an insert edge having a linear, e.g., wiper, portion extending a first distance to an angled portion may lose operational life once the linear portion has worn away, a cutting insert comprising a more sweeping radii or an insert edge having a linear portion extending a second distance, greater than the first, may result in additional insert life. That is, when the linear portion is worn in one area of the cutting insert edge, the actual cutting edge may move to a fresh area of the insert. In one embodiment, dimensions of a cutting insert may comprise a width of 0.375 inches, a thickness of 0.25 inches, and length of 0.75 inches. Where the cutting edged is located along the length of the insert, increasing the length of the insert from 0.75 inches to 1.125 inches or more may provide additional cutting insert life. For example, the cutting edge may comprise an actual cutting edge. The actual cutting edge may progressively move along the edge as it wears. In one embodiment, a cutting edge of one or more of the cutting inserts may comprise an actual cutting edge. The actual cutting edge may, in some instances, may transition along the cutting edge from a first position to a second position when the first position wears, thereby increasing cutting insert life.

Those having ordinary skill in the art, on considering the present description of certain embodiments, will appreciate that the particular desired dimensions of a cutting insert may depend on the desired application, such as the shape, form, location, or environment of a railway rail. Therefore, unless stated otherwise, the above dimensions are merely examples of cutting insert dimensions.

As described above, in various embodiments, the milling cutter may be positioned in an offset configuration with respect to the rail. For example, 3 to 4.5 inches may separate the rotation axis of the milling cutter from the work performed along a rail. In various non-limiting embodiments, and using a 10 inch milling cutter as a scalable reference, milling cutters may be positioned at an offset of between 3.5 inches and 4.0 inches, or may be positioned at an offset of about 3.75 inches. In certain embodiments, the milling cutter may be positioned in an offset orientation comprising a distance between 35% and 40% of the milling cutter diameter. As also described above, in various embodiments, a plurality of milling cutters may be positioned to simultaneously and/or sequentially mill a rail profile. In one embodiment, the milling cutters may define cutting angles between 0° and about 55° about the rail profile.

According to various embodiments, cutting inserts may be supplied with various edge preparations. For example, edge preparations may include 0.002-0.003 inch hone only and a 0.015-0.020 inch×20° negative land with a 0.002-0.003 inch hone. In certain embodiments, reducing the rotational speed of the milling cutter may significantly increase insert life. In one embodiment, the rotational speed of the milling cutter may be reduced and the feed rate or speed of traverse may be increased to increase cutting insert life.

It will be appreciated that while the present disclosure may provide exemplary milling cutter bodies defining 32 cutting insert positions, it is contemplated that milling cutters equipped to accept more than or less than 32 cutting inserts may be used with the methods and apparatuses of the present disclosure. For example, the number of cutting inserts that may be mounted on a face milling cutter is generally determined by the circumference of the peripheral portion of the cutter body defining the insert positions and/or the size of the cutting inserts. In various non-limiting embodiments, the diameter of the milling cutter may be between 8 inches and 16 inches, or between 10 inches and 12 inches. In some embodiments, milling cutters comprising diameters less than 10 inches, such as 4 inches, may be used alone or in combination with other milling cutters comprising diameters that may be less than, greater than, or equal to the milling cutter comprising less than a 10-inch diameter. It is contemplated that reduced diameter milling cutter configurations may be beneficial for milling of difficult to reach segments of rail profile, such as rail at transitions, platforms, or grade crossings. It is also contemplated that milling cutters comprising diameters greater than 10 inches may be used alone or in combination with other milling cutters comprising diameters less than, greater than, or equal to the milling cutter comprising greater than a 10 inch diameter. It is contemplated that increased diameter milling cutters may be used to increase speed or operational life of various sets of cutting inserts. For example, longer insert life spans may increase productivity and shorten rail outage periods due to re-profiling because maintenance personnel will not be required to interrupt the re-profiling process to index or replace cutting inserts as frequently.

In the present description of embodiments, other than in the operating examples or where otherwise indicated, all numbers expressing quantities or characteristics of elements, products, processing or test conditions or parameters, and the like are to be understood as being modified in all instances by the term "about". Accordingly, unless indicated to the contrary, any numerical parameters set forth in the following description are approximations that may vary depending upon the desired properties one seeks to obtain in the apparatuses and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

This disclosure describes various elements, features, aspects, and advantages of various embodiments of rail re-profiling apparatus and methods, systems, and methods thereof. It is to be understood that certain descriptions of the various embodiments have been simplified to illustrate only those elements, features and aspects that are relevant to a more clear understanding of the disclosed embodiments, while eliminating, for purposes of brevity or clarity, other elements, features and aspects. Any references to "various embodiments," "certain embodiments," "some embodiments," "one embodiment," or "an embodiment" generally means that a particular element, feature, and/or aspect described in the embodiment is included in at least one embodiment. The phrases "in various embodiments," "in certain embodiments," "in some embodiments," "in one embodiment," or "in an embodiment" may not refer to the same embodiment. Furthermore, the phrases "in one such embodiment" or "in certain such embodiments," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments.

Although the foregoing description has necessarily presented only a limited number of embodiments, those of ordinary skill in the relevant are will appreciate that various changes in the apparatuses and methods and other details of the examples that have been described and illustrated herein may be made by those skilled in the art, and all such modifications will remain within the principle and scope of the present disclosure as expressed herein and in the appended claims. For example, although the present disclosure has necessarily only presented a limited number of embodiments of rail re-profiling apparatuses and methods, it will be understood that the present disclosure and associated claims are not so limited. Those having ordinary skill will readily identify additional rail re-profiling apparatuses and methods and may design and build and use additional rail re-profiling apparatuses and methods along the lines and within the spirit of the necessarily limited number of embodiments discussed herein. It is understood, therefore, that the present invention is not limited to the particular embodiments or methods disclosed or incorporated herein, but is intended to cover modifications that are within the principle and scope of the invention, as defined by the claims. It will also be appreciated by those skilled in the art that changes could be made to the embodiments and methods discussed herein without departing from the broad inventive concept thereof.

What is claimed is:

1. A method of milling a profile of a railway rail in situ comprising:
    rotating, about a rotation axis, a milling cutter including a plurality of face mounted cutting inserts mounted about a periphery of the milling cutter, each cutting insert including a respective cutting edge having a respective radially outer end and a respective radially inner end;
    milling a facet along the railway rail in situ with the cutting edges rotating in a predetermined plane corresponding to at least a portion of a desired rail profile while controlling a depth of cut of the cutting inserts;
    longitudinally traversing the railway rail with the milling cutter while milling the railway rail; and
    controlling the speed of traverse of the milling cutter along the railway rail;
    wherein the facet has an interior longitudinal edge proximal to the rotation axis of the milling cutter, and has an exterior longitudinal edge distal from the rotation axis of the milling cutter;
    wherein for each complete rotation of the milling cutter about the rotation axis, (i) the radially outer end of the cutting edge of a given one of the cutting inserts enters the facet a first time and a second time and exits the facet a first time and a second time, respectively, and (ii) the radially inner end of the cutting edge of the given one of the cutting inserts enters the facet for a first time and a second time and exits the facet for a first time and a second time, respectively;
    wherein an included angle formed in a plane of a top surface of the railway rail and between the cutting edge of the given one of the cutting inserts and the exterior longitudinal edge of the facet at a point on the exterior longitudinal edge of the facet where the radially outer end of the cutting edge of the given one of the cutting inserts exits the facet for the first time as the milling cutter rotates about the rotation axis is 25° to 50°.

2. The method of claim 1, comprising controlling the speed of traverse of the milling cutter along the railway rail to speeds up to 15 mph.

3. The method of claim 1, comprising controlling the speed of traverse of the milling cutter along the railway rail to speeds greater than 1 mph.

4. The method of claim 1, comprising controlling the speed of traverse of the milling cutter along the railway rail to speeds greater than 3 mph.

5. The method of claim 1, comprising controlling the speed of traverse of the milling cutter along the railway rail to speeds between 1 mph and 15 mph.

6. The method of claim 1, comprising controlling the depth of cut of the cutting inserts to a depth no more than 0.040 inches.

7. The method of claim 1, comprising controlling the depth of cut of the cutting inserts to a depth no more than about 0.010 inches.

8. The method of claim 1, comprising controlling the depth of cut of the cutting inserts to a depth between 0.005 inches and 0.010 inches.

9. The method of claim 1, wherein milling the railway rail comprises milling the railway rail using a conventional milling orientation.

10. The method of claim 1, wherein milling the railway rail comprises milling the railway rail using a climb milling orientation.

11. The method of claim 1, further comprising controlling a width of cut to about 0.625 inches or less.

12. The method of claim 1, wherein the milling cutter comprises one of a bumper ring and a bumper plate.

13. The method of claim 1, wherein the cutting edge of one or more of the plurality of cutting inserts comprises a substantially linear cutting edge region.

14. The method of claim 1, wherein the cutting inserts comprise one of uncoated C6 grade cemented carbide and coated C6 grade cemented carbide.

15. The method of claim 1, wherein the rotation axis of the milling cutter is offset from the facet being milled by the milling cutter on the railway rail by a distance between 35% and 40% of a diameter of the milling cutter.

16. The method of claim 1, wherein the milling cutter comprises a diameter between 8 inches and 16 inches.

17. The method of claim 1, wherein the facet milled by the milling cutter comprises a width of 0.12 to 1.12 inches.

18. The method of claim 1, wherein the milling cutter comprises a diameter in the range 4 inches to 16 inches.

19. The method of claim 1, wherein the rotation axis of the milling cutter is offset from the facet being milled by the milling cutter on the railway rail by a distance of 3 to 4.5 inches.

20. The method of claim 1, comprising controlling the speed of traverse of the milling cutter along the railway rail to speeds greater than 15 mph.

21. The method of claim 1, wherein the cutting edge of each of the plurality of cutting inserts has a length greater than a width of the facet being milled by the milling cutter on the railway rail.

22. The method of claim 1, wherein the cutting edge of each of the cutting inserts is disposed in a plane that is parallel to a plane in which the milling cutter rotates.

23. The method of claim 1, wherein the milling cutter is mounted to a carriage that moves along the railway railing in situ.

* * * * *